United States Patent
Bursell et al.

(10) Patent No.: US 11,593,493 B2
(45) Date of Patent: *Feb. 28, 2023

(54) PROVIDING SMART CONTRACTS INCLUDING SECRETS ENCRYPTED WITH ORACLE-PROVIDED ENCRYPTION KEYS

(71) Applicant: Red Hat, Inc., Raleigh, NC (US)

(72) Inventors: Michael H. M. Bursell, Farnborough (GB); Axel Simon, Paris (FR); Nathaniel McCallum, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 728 days.

This patent is subject to a terminal disclaimer.

(21) Appl. No.: 16/252,008

(22) Filed: Jan. 18, 2019

(65) Prior Publication Data
US 2020/0234294 A1     Jul. 23, 2020

(51) Int. Cl.
*G06F 21/60*     (2013.01)
*H04L 9/32*     (2006.01)
(Continued)

(52) U.S. Cl.
CPC .......... *G06F 21/602* (2013.01); *H04L 9/0825* (2013.01); *H04L 9/32* (2013.01); *H04L 9/50* (2022.05); *H04L 2209/56* (2013.01)

(58) Field of Classification Search
CPC ................ G06Q 20/3829; G06Q 20/02; G06F 16/1824; G06F 21/602; H04L 9/0825; H04L 9/32
See application file for complete search history.

(56) References Cited

U.S. PATENT DOCUMENTS

| 10,026,118 B2 | 7/2018 | Castinado et al. |
| 10,601,585 B1 | 3/2020 | Robinson et al. |
| 2002/0112171 A1* | 8/2002 | Ginter .................. G06Q 20/102 713/185 |

(Continued)

FOREIGN PATENT DOCUMENTS

| WO | 2016063092 A1 | 4/2016 |
| WO | 2017127620 A1 | 7/2017 |

(Continued)

OTHER PUBLICATIONS

Steve Ellis et al., ChainLink A Decentralized Oracle Network, Sept. 4, 2017, pp. 1-28 (Year: 2017).*

(Continued)

*Primary Examiner* — Neha Patel
*Assistant Examiner* — Courtney P Jones
(74) *Attorney, Agent, or Firm* — Dority & Manning, P.A.

(57) ABSTRACT

Providing smart contracts including secrets encrypted with oracle-provided encryption keys is disclosed. In one example, a contract creator encrypts sensitive data necessary for executing a smart contract into ciphertext using a symmetric cryptographic key K, and also encrypts the symmetric cryptographic key K into a wrapper using a public cryptographic key e of a contract executor. The contract creator then generates an envelope using a public cryptographic key o of a contract oracle, where the envelope includes the wrapper encrypted using the public cryptographic key o and a policy that includes condition(s) precedent and is digitally authenticated. The smart contract, including the envelope and the ciphertext, is deployed to the contract executor. The sensitive data thus may be provided within the smart contract itself, while being protected from unauthorized access in the event the smart contract is malicious or is compromised.

20 Claims, 17 Drawing Sheets

(51) Int. Cl.
*H04L 9/08* (2006.01)
*H04L 9/00* (2022.01)

(56) References Cited

U.S. PATENT DOCUMENTS

| | | | |
|---|---|---|---|
| 2012/0259759 A1 | 10/2012 | Crist et al. | |
| 2013/0121490 A1 | 5/2013 | Boliek et al. | |
| 2013/0232339 A1 | 9/2013 | Ignatchenko et al. | |
| 2015/0256336 A1* | 9/2015 | Stiglic | H04L 9/0825 380/281 |
| 2017/0085545 A1 | 3/2017 | Lohe et al. | |
| 2017/0287068 A1* | 10/2017 | Nugent | G06Q 40/04 |
| 2018/0089758 A1* | 3/2018 | Stradling | G06F 12/1408 |
| 2018/0094953 A1 | 4/2018 | Colson et al. | |
| 2018/0097783 A1 | 4/2018 | Haldenby et al. | |
| 2018/0123804 A1 | 5/2018 | Smith et al. | |
| 2018/0191503 A1 | 7/2018 | Alwar et al. | |
| 2018/0218176 A1* | 8/2018 | Voorhees | H04L 9/3213 |
| 2018/0227118 A1 | 8/2018 | Bibera et al. | |
| 2019/0035014 A1 | 1/2019 | Bell et al. | |
| 2019/0114706 A1* | 4/2019 | Bell | H04L 9/0825 |
| 2019/0158275 A1* | 5/2019 | Beck | H04L 63/20 |
| 2019/0220831 A1* | 7/2019 | Rangarajan | H04L 9/3066 |
| 2020/0059454 A1* | 2/2020 | Yang | H04L 63/0435 |
| 2020/0143337 A1 | 5/2020 | Conroy et al. | |
| 2020/0162252 A1* | 5/2020 | Davis | G06F 21/105 |
| 2020/0175590 A1 | 6/2020 | Huo | |
| 2020/0374272 A1* | 11/2020 | Zhang | H04L 9/0819 |
| 2020/0396079 A1* | 12/2020 | Dekant | H04L 63/0435 |
| 2020/0401734 A1 | 12/2020 | Murdoch et al. | |
| 2021/0035090 A1 | 2/2021 | Iannaccone | |
| 2021/0194890 A1 | 6/2021 | Mohalik et al. | |

FOREIGN PATENT DOCUMENTS

| | | | |
|---|---|---|---|
| WO | 2018058105 A1 | 3/2018 | |
| WO | 2018224431 A1 | 12/2018 | |

OTHER PUBLICATIONS

Author Unknown, "Oraclize Documentation," docs.oraclize.it/#home, accessed on Jul. 26, 2018, 29 pages.

Author Unknown, "Is it possible to make a contract with an encrypted payload," Reddit thread, reddit.eom/r/ethereum/comments/4kd77q/is_it_possible_to_make_a_contract_with_an/, accessed on Aug. 1, 2018, 4 pages.

Author Unknown, "Encrypted Queries: Private Data on a Public Blockchain," blog.oraclize.it/encrypted-queries-private-data-on-a-public-blockchain-71d893fac2bf, accessed on Jul. 26, 2018, 8 pages.

Bertani, Thomas, "Understanding oracles," Oraclize, blog.oraclize it/understanding-oracles-99055c9c9f7b, Feb. 18, 2016, 5 pages.

Hertig, Alyssa,"How Ethereum Works," www.coindesk.com/information/how-ethereum-works, accessed Dec. 7, 2018, 5 pages.

Lin, Connor, et al., "A Price-Stable Cryptocurrency for Next-Generation Payments," Carbon, Version 1.0 0, Apr. 3, 2018, 21 pages.

Linder, Peter, "Decryption Contract Enforcement Tool (DECENT): A Practical Alternative to Government Decryption Backdoors," Technology Brief, Version 1.0, Mar. 31, 2016, IACR, 20 pages.

Mik, Eliza, "Smart contracts: Terminology, technical limitations and real world complexity," Law, Innovation and Technology, vol. 9, Issue 2, Oct. 2017, Research Collection School of Law, 27 pages.

Zhang, Fan, et al., "Town Crier: An Authenticated Data Feed for Smart Contracts," ACM Conference on Computer and Communications Security, Oct. 2016, Vienna, Austria, ACM, 20 pages.

Cardoso, Jose, "Blockchain and Smart Contracts for the Internet of Things—an Architecture for Sensor Data Availability," LISBOA 2018, 90 pages.

Curran, Brian, "What are Oracles? Smart Contracts, Chainlink & 'The Oracle Problem'," Sep. 19, 2018, blockonomi.com/oracles-guide/, Kooc Media Ltd., 13 pages.

Shrier, Allison, et al., "Blockchain and Health IT: Algorithms, Privacy, and Data," White Paper, Aug. 8, 2016, 166 pages.

Non-Final Office Action for U.S. Appl. No. 16/252,068, dated Mar. 2, 2021, 25 pages.

Notice of Allowance for U.S. Appl. No. 16/252,068, dated Jul. 21, 2021, 10 pages.

Non-Final Office Action for U.S. Appl. No. 16/282,052, dated Apr. 1, 2021, 16 pages.

Non-Final Office Action for U.S. Appl. No. 16/510,453, dated Aug. 31, 2021, 9 pages.

Notice of Allowance for U.S. Appl. No. 16/282,052, dated Dec. 21, 2021, 9 pages.

* cited by examiner

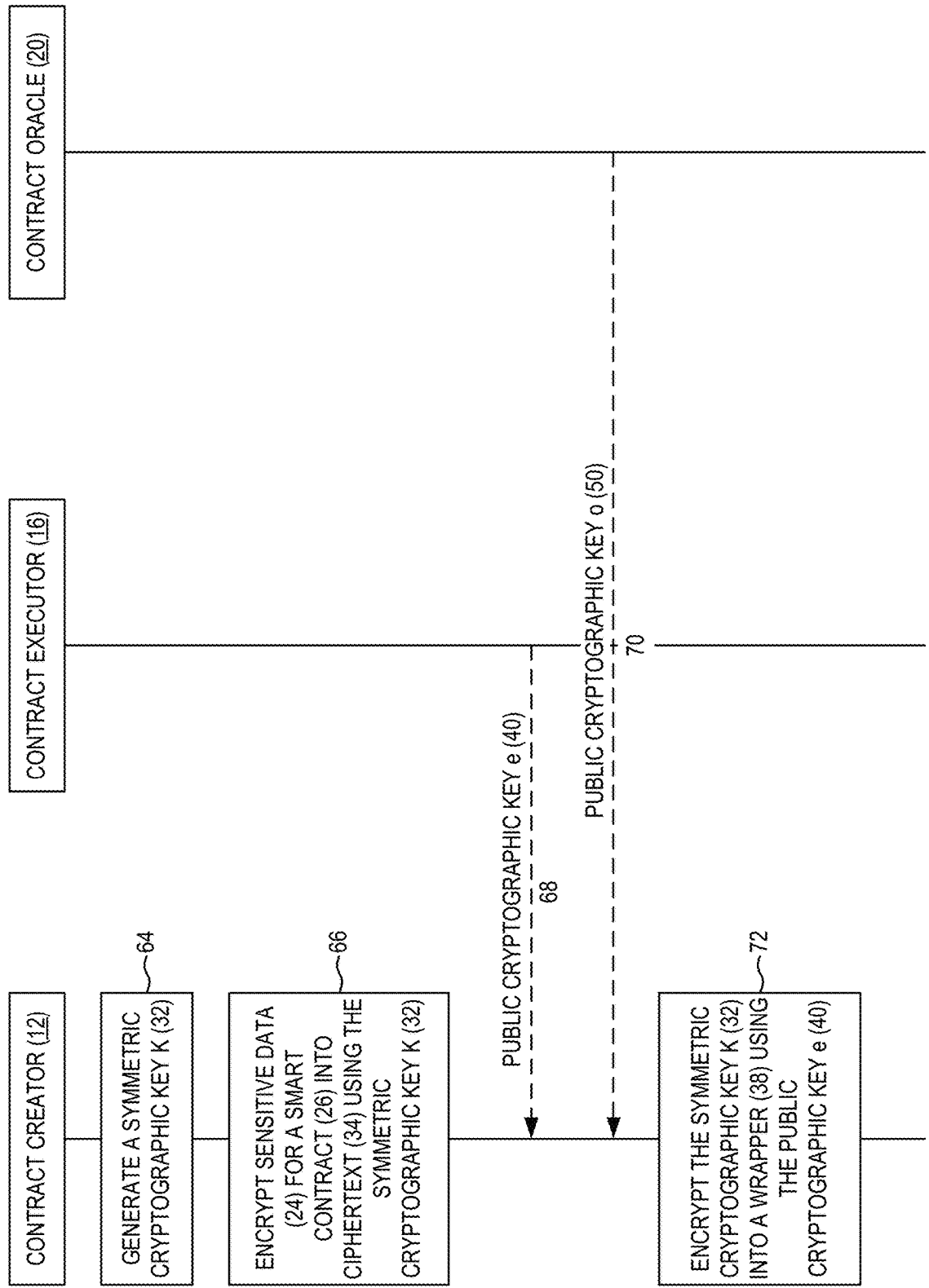

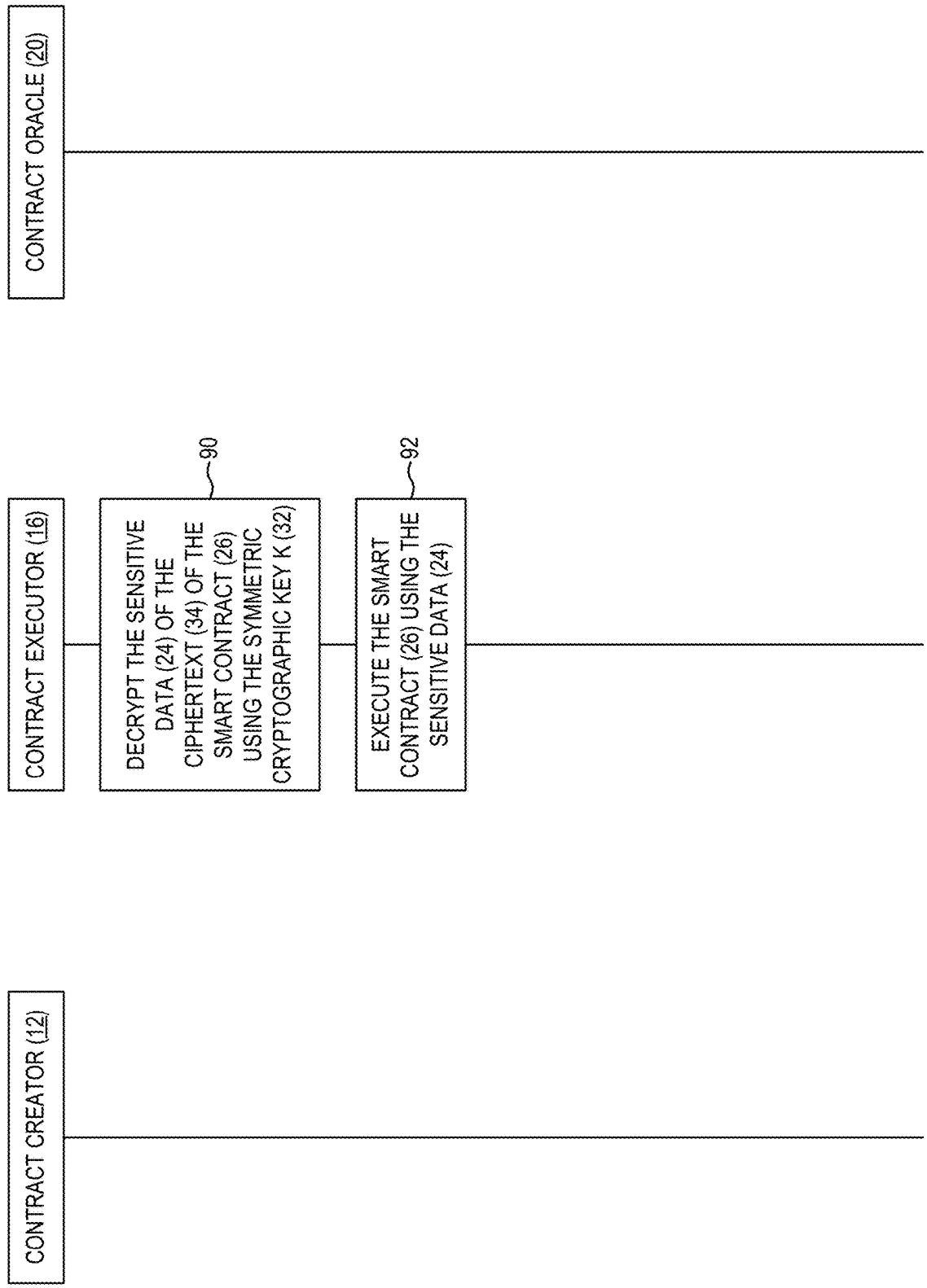

PROVIDING SMART CONTRACTS INCLUDING SECRETS ENCRYPTED WITH ORACLE-PROVIDED ENCRYPTION KEYS

TECHNICAL FIELD

The examples relate generally to smart contracts, such as smart contracts implemented using distributed ledgers provided by distributed ledger networks, and, in particular, to securing sensitive data within smart contracts.

BACKGROUND

Smart contracts, such as smart contracts provided by distributed ledger networks, are self-executing computer code containing logic that enables operations to be automatically performed upon satisfaction of one or more conditions precedent specified by a policy of the smart contract.

SUMMARY

The examples implement mechanisms whereby sensitive data necessary for executing a smart contract is encrypted into ciphertext (i.e., encrypted text) by a contract creator using a symmetric cryptographic key K. The contract creator also encrypts the symmetric cryptographic key K itself into a wrapper using a public cryptographic key e of a contract executor, where the public cryptographic key e corresponds to a private cryptographic key E of the contract executor. The contract creator then generates an envelope using a public cryptographic key o of a contract oracle, where the public cryptographic key o corresponds to a private cryptographic key O of the contract oracle and the envelope includes the wrapper encrypted using the public cryptographic key o and a policy that includes one or more conditions precedent and is digitally authenticated. The smart contract, including the envelope and the ciphertext, is then deployed by the contract creator to the contract executor. In this manner, the sensitive data required to execute the smart contract may be provided within the smart contract itself, while being protected from unauthorized access in the event the smart contract is malicious or is compromised.

In one example, a computing system is provided. The computing system comprises a contract creator comprising a first computing device comprising a first memory and a first processor device coupled to the first memory. The contract creator is to generate a symmetric cryptographic key K, and encrypt sensitive data for a smart contract into ciphertext using the symmetric cryptographic key K. The contract creator is further to encrypt the symmetric cryptographic key K into a wrapper using a public cryptographic key e of a contract executor, the public cryptographic key e corresponding to a private cryptographic key E of the contract executor. The contract creator is also to generate an envelope using a public cryptographic key o of a contract oracle, the public cryptographic key o corresponding to a private cryptographic key O of the contract oracle, and the envelope comprising the wrapper encrypted using the public cryptographic key o and a policy that comprises one or more conditions precedent and is digitally authenticated. The contract creator is additionally to deploy the smart contract comprising the envelope and the ciphertext to the contract executor.

In another example, a computing system is provided. The computing system comprises a means for generating a symmetric cryptographic key K, and a means for encrypting sensitive data for a smart contract into ciphertext using the symmetric cryptographic key K. The computing system further comprises a means for encrypting the symmetric cryptographic key K into a wrapper using a public cryptographic key e of a contract executor, the public cryptographic key e corresponding to a private cryptographic key E of the contract executor. The computing system also comprises a means for generating an envelope using a public cryptographic key o of a contract oracle, the public cryptographic key o corresponding to a private cryptographic key O of the contract oracle, and the envelope comprising the wrapper encrypted using the public cryptographic key o and a policy that comprises one or more conditions precedent and is digitally authenticated. The computing system additionally comprises a means for deploying a smart contract comprising the envelope and the ciphertext to the contract executor.

In another example, a method is provided. The method comprises generating, by a contract creator comprising a first computing device, a symmetric cryptographic key K. The method further comprises encrypting, by the contract creator, sensitive data for a smart contract into ciphertext using the symmetric cryptographic key K. The method also comprises encrypting, by the contract creator, the symmetric cryptographic key K into a wrapper using a public cryptographic key e of a contract executor comprising a second computing device, the public cryptographic key e corresponding to a private cryptographic key E of the contract executor. The method additionally comprises generating, by the contract creator, an envelope using a public cryptographic key o of a contract oracle comprising a third computing device, the public cryptographic key o corresponding to a private cryptographic key O of the contract oracle, and the envelope comprising the wrapper encrypted using the public cryptographic key o and a policy that comprises one or more conditions precedent and is digitally authenticated. The method further comprises deploying, by the contract creator, the smart contract comprising the envelope and the ciphertext to the contract executor.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 2A-2D are messaging diagrams illustrating communication flows among elements of the computing system of FIG. 1 for providing smart contracts including sensitive data, according to one example;

DETAILED DESCRIPTION

Figure 1:
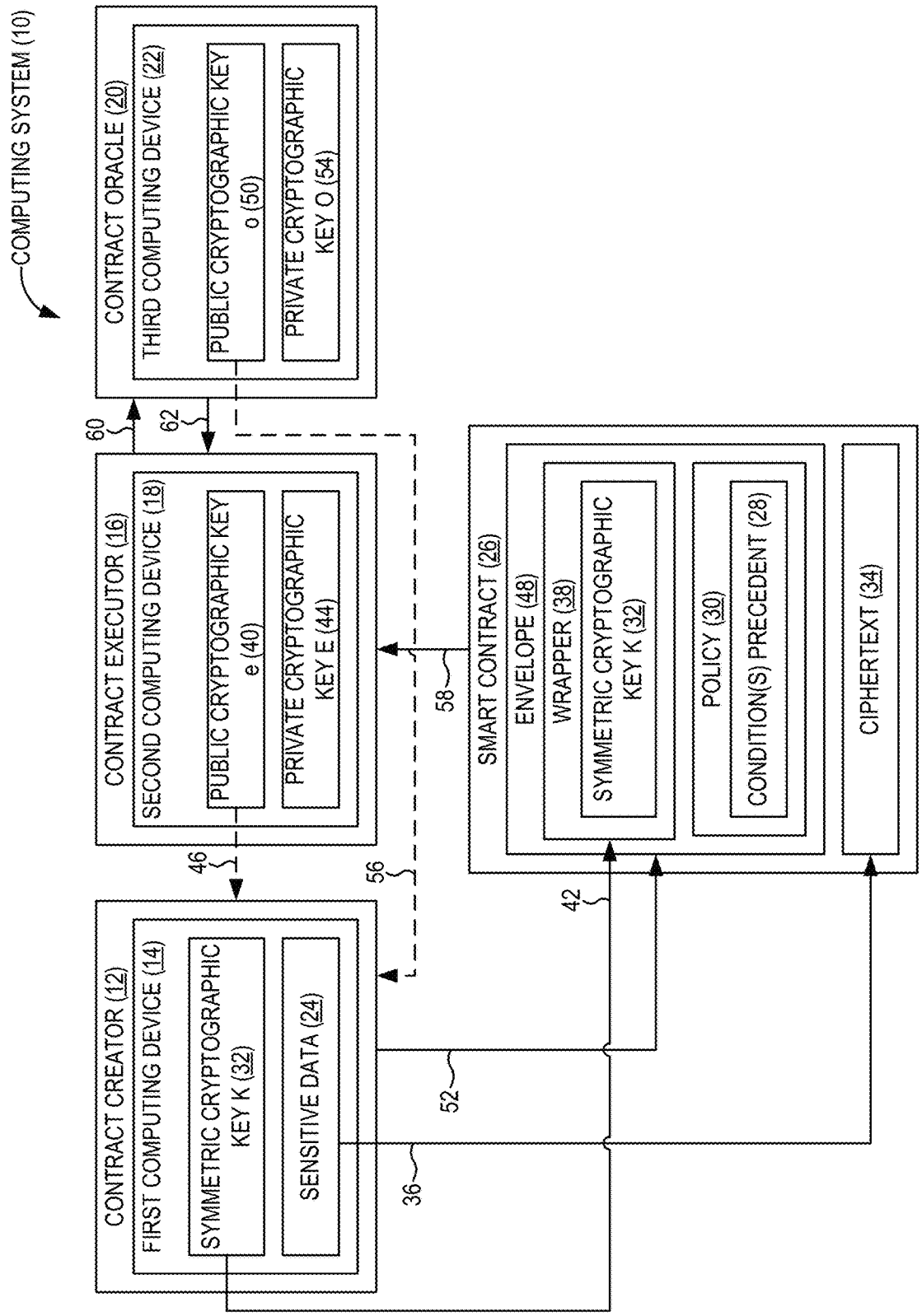
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refer to "one or more" of the element unless otherwise explicitly specified.

A smart contract is executable computer code that specifies a policy under which digital assets may be automatically redistributed among parties to the smart contract. The policy specifies one or more conditions precedent that must be satisfied before the smart contract is automatically enforced. Once the condition(s) precedent are met, a contract executor (which, in some examples, may comprise a node of a distributed ledger network) automatically carries out the terms of the smart contract by executing one or more operations specified by the smart contract code. In this manner, the smart contract enables automatic verification and performance of an agreement or transaction. Smart contract functionality may be provided by a distributed ledger network, such as the blockchain-based Bitcoin, Ethereum, and Litecoin distributed ledger networks.

For some smart contracts, the condition(s) precedent that determine whether or not the smart contract should be executed may be based on external data that is only available from sources external to the contract executor. Accordingly, to evaluate whether the condition(s) precedent have been satisfied, the contract executor may obtain or receive the external data from a third party agent referred to as a "contract oracle." The contract oracle may be configured to provide access to any type of data, such as (but not limited to) weather conditions, account balances, and/or current or historical prices of commodities, goods, and/or services. Additionally, the data provided by a contract oracle may be obtained by the contract oracle from online sources and/or from hardware sensors, as non-limiting examples.

Many smart contracts may require the contract executor to provide sensitive data in order to perform operations specified by the smart contract when the condition(s) precedent have been satisfied. For instance, a smart contract may specify that, if and when the price of a given stock falls below a specified level, a stock purchase operation will be automatically performed. The stock purchase operation may require a cryptographic key for authentication and security purposes. However, it may be undesirable to store sensitive data such as the cryptographic key within the smart contract itself, as such sensitive data may be exposed if the smart contract is malicious or has been compromised.

In this regard, FIG. 1 illustrates a computing system 10 for providing smart contracts including secrets encrypted with oracle-provided encryption keys. The computing system 10 of FIG. 1 includes a contract creator 12 comprising a first computing device 14, a contract executor 16 comprising a second computing device 18, and a contract oracle 20 comprising a third computing device 22. In some examples, the contract executor 16 may comprise a node of a distributed ledger network (e.g., a Bitcoin, Litecoin, or Ethereum distributed ledger network, as non-limiting examples) that maintains a local copy of a distributed ledger (e.g., a blockchain, as a non-limiting example). The contract creator 12, the contract executor 16, and the contract oracle 20 are each communicatively coupled to the others.

The contract creator 12 in the example of FIG. 1 maintains sensitive data 24, which represents any sensitive data that is required to carry out an operation to be performed by a smart contract 26 upon satisfaction of one or more conditions precedent 28 of a policy 30 of the smart contract 26. For example, the sensitive data 24 may comprise a cryptographic key for authenticating an identity of a user of the contract creator 12 and/or for authorizing an operation on behalf of a user of the contract creator 12, as non-limiting examples. Instead of storing the sensitive data 24 directly within the smart contract 26, the contract creator 12 generates a symmetric cryptographic key K 32, and uses the symmetric cryptographic key K 32 to encrypt the sensitive data 24 as ciphertext 34, as indicated by arrow 36. The symmetric cryptographic key K 32 itself is then encrypted into a wrapper 38 using a public cryptographic key e 40 of the contract executor 16, as indicated by arrow 42. The public cryptographic key e 40 of the contract executor 16 corresponds to a private cryptographic key E 44 of the contract executor 16, and, in some examples, may be provided by the contract executor 16 to the contract creator 12, as indicated by arrow 46. Consequently, only the contract executor 16, the holder of the private cryptographic key E 44, is able to decrypt the wrapper 38 containing the symmetric cryptographic key K 32 of the contract creator 12.

After encrypting the symmetric cryptographic key K 32 into the wrapper 38, the contract creator 12 generates an envelope 48 using an authenticated encryption with associated data (AEAD) encryption method and a public cryptographic key o 50 of the contract oracle 20, as indicated by arrow 52. The public cryptographic key o 50 corresponds to a private cryptographic key O 54 of the contract oracle 20, and, in some examples, may be provided by the contract oracle 20 to the contract creator 12, as indicated by arrow 56. The envelope 48 generated by the contract creator 12 includes the wrapper 38 encrypted using the public cryptographic key o 50 of the contract oracle 20, and also includes the policy 30 that is digitally authenticated by the AEAD encryption method, and which may comprise a header or metadata of the envelope 48 in some examples. As a result, only the contract oracle 20, the holder of the private cryptographic key O 54, is able to authenticate the policy 30 and decrypt the envelope 48 to obtain the wrapper 38.

The contract creator 12 then deploys the smart contract 26, containing the envelope 48 and the ciphertext 34, to the contract executor 16, as indicated by arrow 58. In some examples, the contract creator 12 may encrypt the envelope 48 of the smart contract 26 prior to deploying the smart contract 26 to the contract executor 16. However, encrypting the envelope 48 may not be necessary in examples in which the contract creator 12 is configured to deploy the smart contract 26 to the contract executor 16 using a secure transport protocol such as Secure Sockets Layer (SSL) and/or Transport Layer Security (TLS), as non-limiting examples.

Subsequently, in some examples, the contract executor 16 to which the smart contract 26 was deployed may determine whether the one or more conditions precedent 28 of the policy 30 of the smart contract 26 have been satisfied, thus indicating that the smart contract 26 can be executed. If so, the contract executor 16 needs to obtain the sensitive data 24 encrypted as the ciphertext 34 within the smart contract 26 in order to execute the smart contract 26. However, recall that the wrapper 38, which contains the symmetric cryptographic key K 32 required to decrypt the ciphertext 34, was encrypted using the public cryptographic key o 50 of the contract oracle 20. Accordingly, the contract executor 16 transmits the envelope 48 of the smart contract 26 to the contract oracle 20, as indicated by arrow 60.

After receiving the envelope 48, the contract oracle 20 next confirms that the condition(s) precedent 28 of the policy 30 of the smart contract 26 have been satisfied. If so, the contract oracle 20 decrypts the wrapper 38 using the private cryptographic key O 54, and then transmits the wrapper 38 back to the contract executor 16, as indicated by arrow 62. Note that, in some examples such as those in which evaluating the policy 30 may cause a state change within the contract oracle 20, the contract oracle 20 may opt to decrypt the wrapper 38 prior to evaluating the policy 30, rather than subsequent to evaluating the policy 30. The contract executor 16 then decrypts the symmetric cryptographic key K 32 of the wrapper 38 using the private cryptographic key E 44. Using the symmetric cryptographic key K 32, the contract executor 16 decrypts the sensitive data 24 of the ciphertext 34 of the smart contract 26, and executes the smart contract 26 using the sensitive data 24.

The utility of the computing system 10 may be illustrated by an example use case. Assume that the purpose of the smart contract 26 is to sell 100 shares of Red Hat stock if and when the price per share exceeds $200, as determined by a stock price agent represented by the contract oracle 20. The contract creator 12 thus generates the smart contract 26 indicating a stock sell operation to sell 100 shares of Red Hat stock, and the one or more conditions precedent 28 specifying a threshold stock price of $200 as determined by the contract oracle 20. To perform the stock sell operation, the contract creator 12 must provide the sensitive data 24, which, in this example use case, comprises authentication information for the contract oracle 20. Accordingly, the contract creator 12 encrypts the sensitive data 24 and the symmetric cryptographic key K 32 as described above, and then deploys the smart contract 26 to the contract executor 16. At a later point in time, the contract executor 16 evaluates the condition(s) precedent 28 of the policy 30 and determines that that the current price of Red Hat stock is $205. The contract executor 16 thus concludes that the one or more conditions precedent 28 have been met, and interacts with the contract oracle 20 as described above to obtain the symmetric cryptographic key K 32. The contract executor 16 uses the symmetric cryptographic key K 32 to decrypt the ciphertext 34 to obtain the sensitive data 24, and uses the sensitive data 24 (i.e., the authentication information for the contract creator 12) to execute the stock sell operation.

FIGS. 2A-2D illustrate communication flows among the elements of the computing system 10 of FIG. 1 for providing smart contracts including sensitive data, according to one example. Elements of FIG. 1 are referenced in describing FIGS. 2A-2D for the sake of clarity. As seen in FIGS. 2A-2D, each of the contract creator 12, the contract executor 16, and the contract oracle 20 are represented by vertical lines, with communications between these elements illustrated by captioned arrows, and operations performed by each element illustrated by captioned boxes.

Figure 2B:
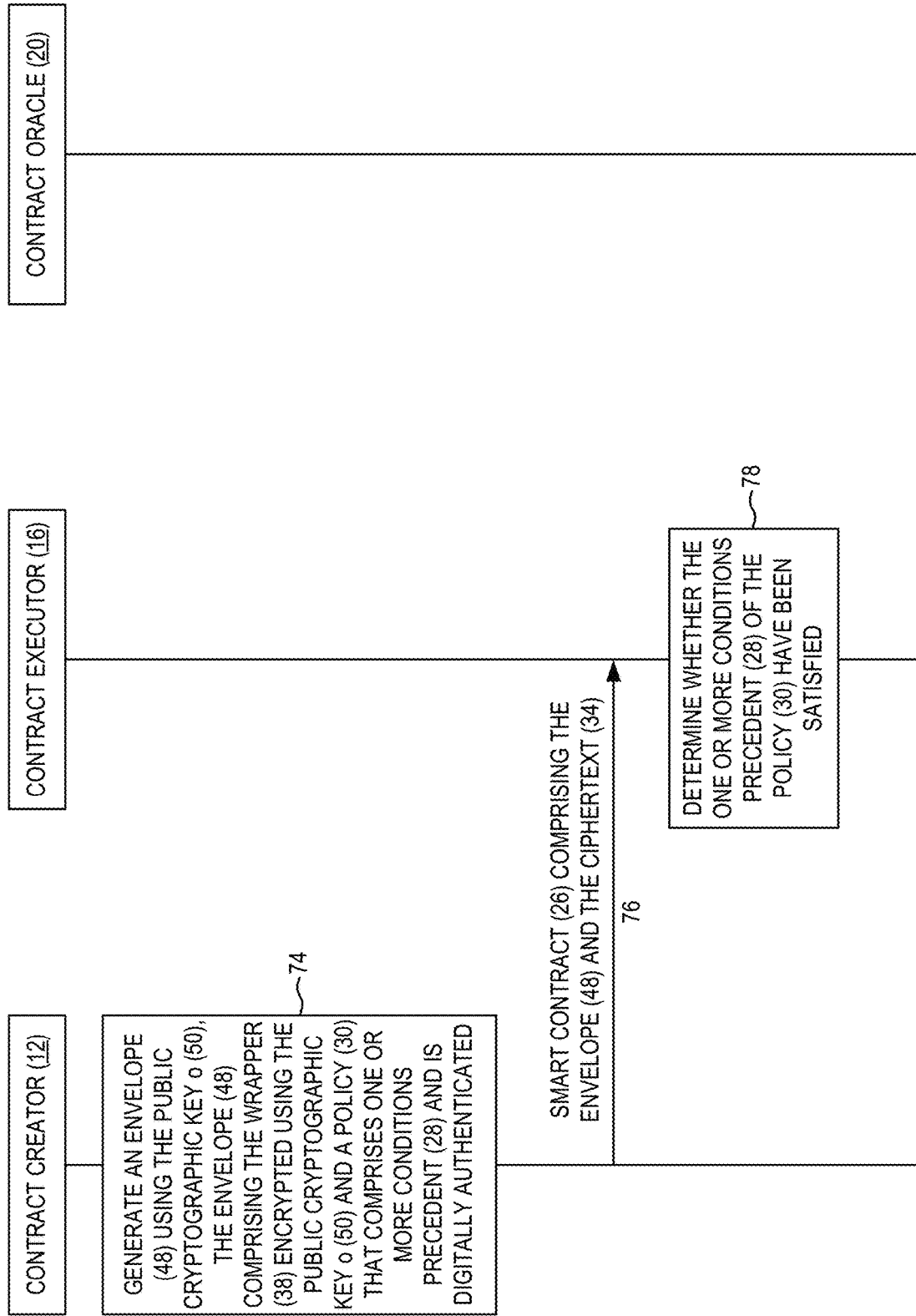

In the example of FIG. 2A, operations begin with the contract creator 12 generating the symmetric cryptographic key K 32, as indicated by box 64. The contract creator 12 encrypts the sensitive data 24 for the smart contract 26 into the ciphertext 34 using the symmetric cryptographic key K 32, as indicated by box 66. In some examples, the contract creator 12 may receive the public cryptographic key e 40 from the contract executor 16 as indicated by arrow 68, and may also receive the public cryptographic key o 50 from the contract oracle 20 as indicated by arrow 70. The contract creator 12 then encrypts the symmetric cryptographic key K 32 into the wrapper 38 using the public cryptographic key e 40, as indicated by block 72. Operations then continue in FIG. 2B.

Referring now to FIG. 2B, the contract creator 12 generates the envelope 48 using the public cryptographic key o 50, the envelope 48 comprising the wrapper 38 encrypted using the public cryptographic key o 50 and the policy 30 that comprises the one or more conditions precedent 28 and is digitally authenticated, as indicated by box 74. The contract creator 12 then deploys the smart contract 26, comprising the envelope 48 and the ciphertext 34, to the contract executor 16, as indicated by arrow 76. At a later time, the contract executor 16 in some examples may determine whether the one or more conditions precedent 28 of the policy 30 have been satisfied, as indicated by box 78. Operations then resume in FIG. 2C.

Figure 2C:
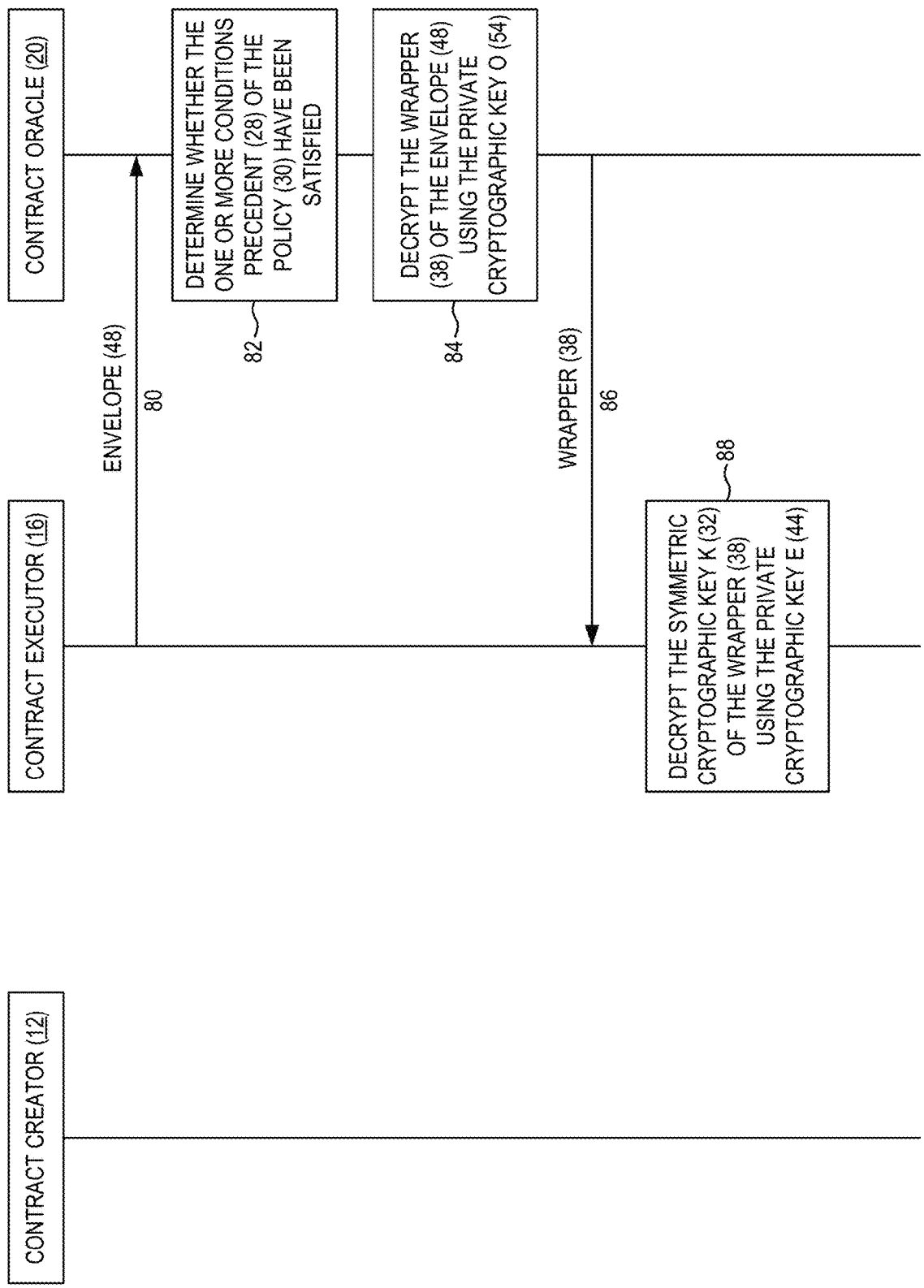

Turning to FIG. 2C, the contract executor 16, upon determining that the one or more conditions precedent 28 of the policy 30 have been satisfied, transmits the envelope 48 to the contract oracle 20, as indicated by arrow 80. The contract oracle 20 determines whether the one or more conditions precedent 28 of the policy 30 have been satisfied, as indicated by box 82. If so, the contract oracle 20 decrypts the wrapper 38 of the envelope 48 using the private cryptographic key O 54, as indicated by box 84. The contract oracle 20 then transmits the wrapper 38 to the contract executor 16, as indicated by arrow 86. Note that, in some examples, the operations of blocks 82 and 84 may be performed in reverse order relative to the order illustrated in FIG. 2C. The contract executor 16 decrypts the symmetric cryptographic key K 32 of the wrapper 38 using the private cryptographic key E 44, as indicated by box 88. Operations then continue in FIG. 2D.

As seen in FIG. 2D, the contract executor 16 decrypts the sensitive data 24 of the ciphertext 34 of the smart contract 26 using the symmetric cryptographic key K 32, as indicated by box 90. The contract executor 16 then executes the smart contract 26 using the sensitive data 24, as indicated by box 92.

Figure 3A:
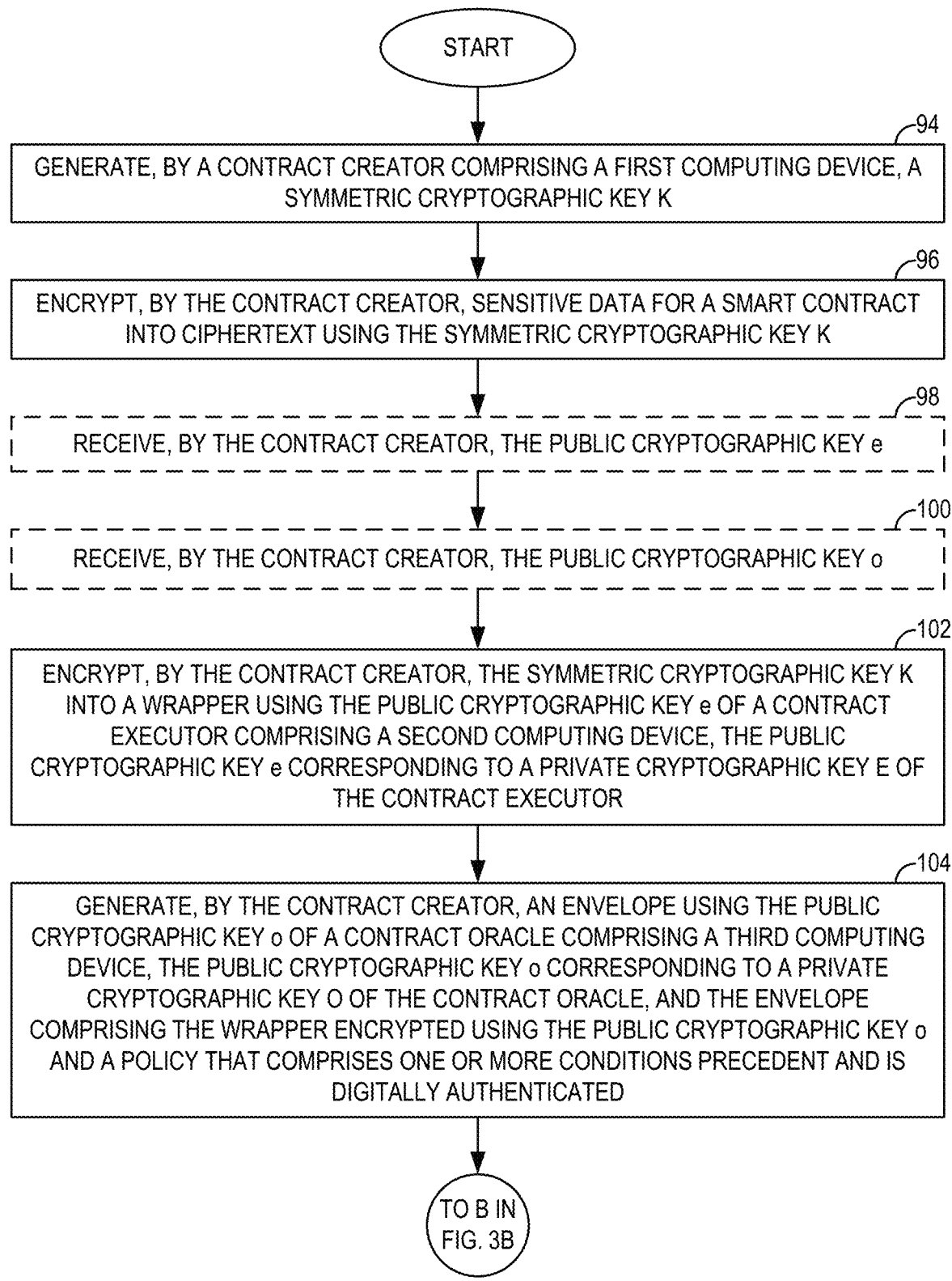
FIGS. 3A and 3B are flowcharts illustrating operations providing smart contracts including encryption and decryption of sensitive data, according to one example.
Figure 3B:
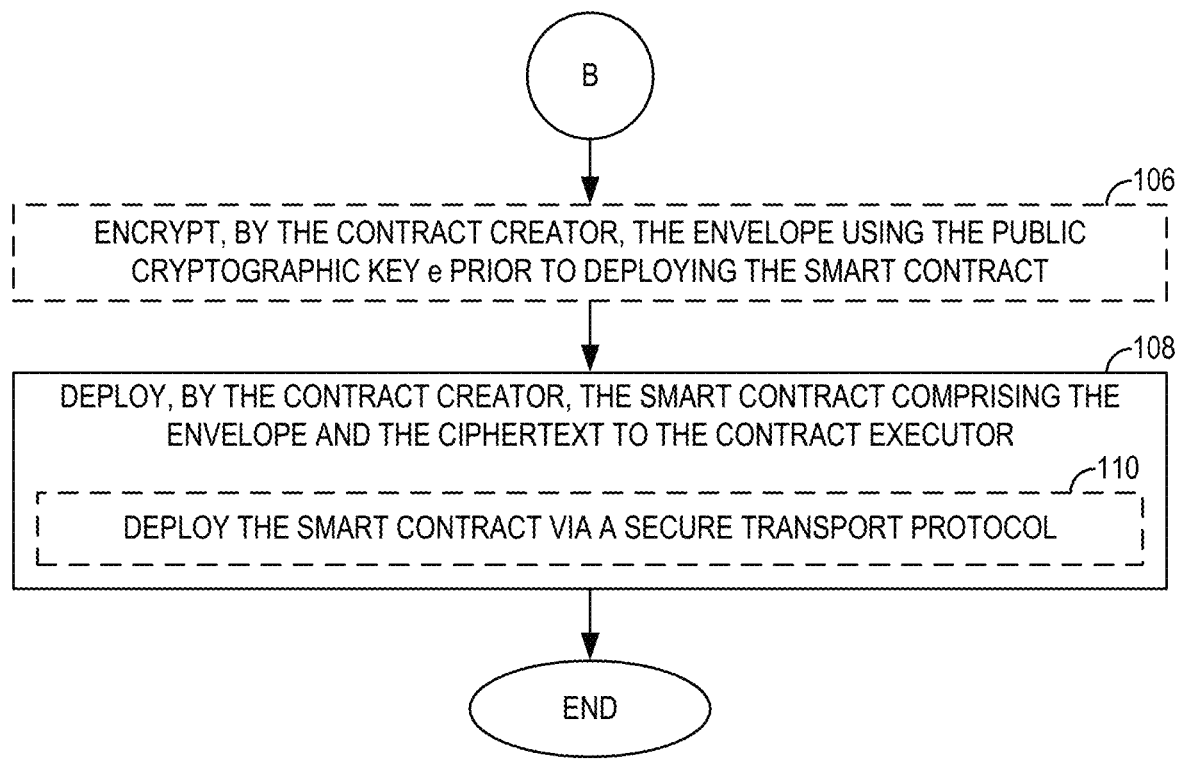

To illustrate operations for providing smart contracts including encryption and decryption of sensitive data, FIGS. 3A and 3B are provided. For the sake of clarity, elements of FIG. 1 are referenced in describing FIGS. 3A and 3B. Operations in FIG. 3A begin with the contract creator 12 of FIG. 1 generating the symmetric cryptographic key K 32 (block 94). The contract creator 12 then encrypts the sensitive data 24 for the smart contract 26 into the ciphertext 34 using the symmetric cryptographic key K 32 (block 96).

According to some examples, the contract creator 12 may receive the public cryptographic key e 40 (e.g., from the contract executor 16) (block 98). Similarly, in some examples, the contract creator 12 may receive the public cryptographic key o 50 (e.g., from the contract oracle 20) (block 100). The contract creator 12 then encrypts the symmetric cryptographic key K 32 into the wrapper 38 using the public cryptographic key e 40 of the contract executor 16, where the public cryptographic key e 40 corresponds to the private cryptographic key E 44 of the contract executor 16 (block 102). The contract creator 12 next generates the envelope 48 using the public cryptographic key o 50 of the contract oracle 20, where the public cryptographic key o 50 corresponds to a private cryptographic key O 54 of the contract oracle 20, and the envelope 48 comprises the wrapper 38 encrypted using the public cryptographic key o 50 and the policy 30 that comprises the one or more conditions precedent 28 and is digitally authenticated (block 104). Processing then resumes at block 106 of FIG. 3B.

Referring now to FIG. 3B, in some examples, the contract creator 12 may encrypt the envelope 48 using the public cryptographic key e 40 prior to deploying the smart contract 26 (block 106). This operation may be omitted in examples in which the contract creator 12 is configured to communicate with the contract executor 16 via a secure transport protocol. The contract creator 12 then deploys the smart contract 26 comprising the envelope 48 and the ciphertext 34 to the contract executor 16 (block 108). Some examples may provide that the operations of block 108 for deploying the smart contract 26 comprise deploying the smart contract 26 via a secure transport protocol (block 110). Operations in FIG. 3B then end.

Figure 4:
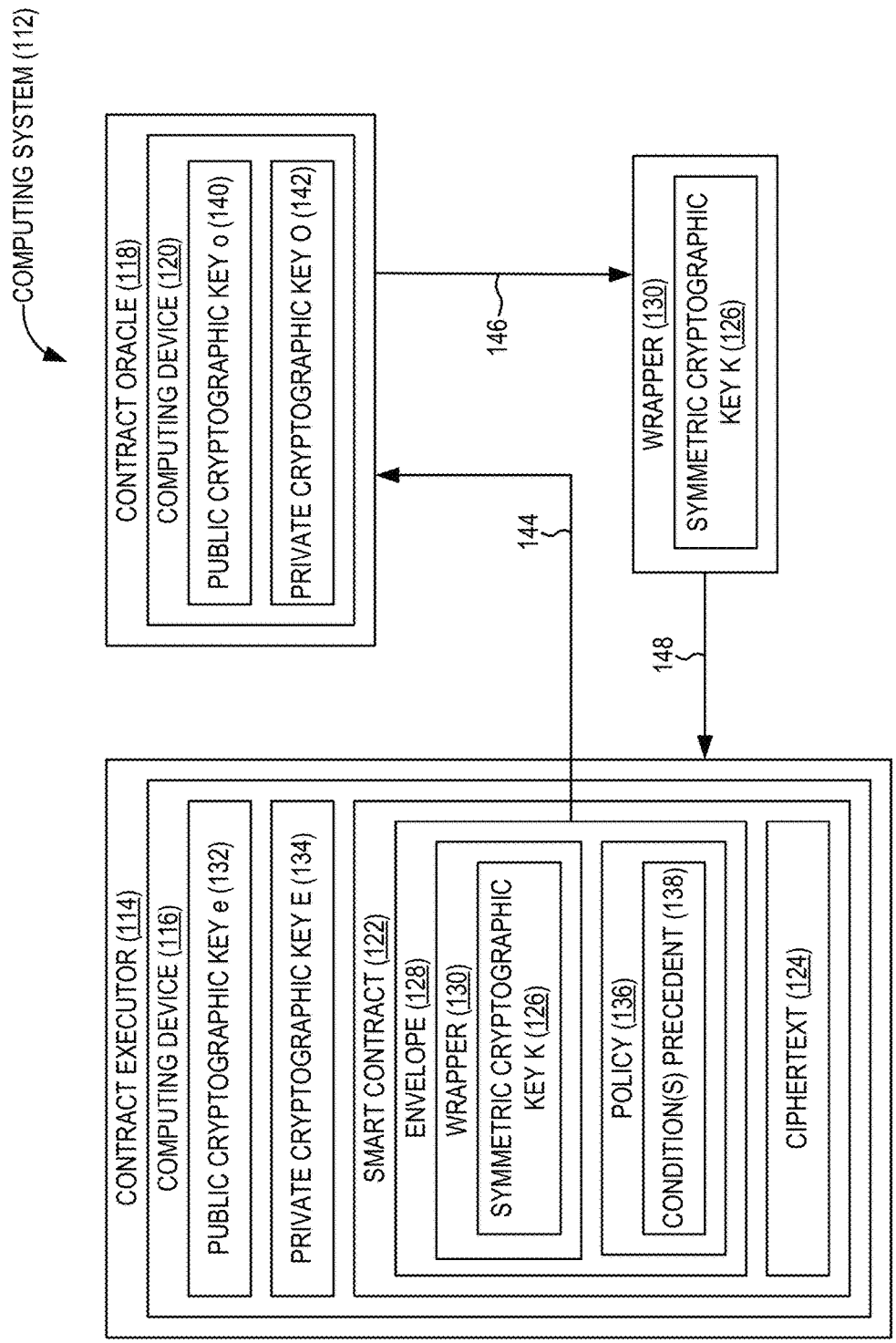
FIG. 4 is a simpler block diagram of the computing system of FIG. 1 for obtaining a symmetric cryptographic key K of a contract creator by a contract executor, according to one example.

FIG. 4 is a simpler block diagram of a computing system 112, corresponding to the computing system 10 of FIG. 1, for obtaining a symmetric cryptographic key K of a contract creator by a contract executor, according to one example. In the example of FIG. 4, the computing system 112 includes a contract executor 114 comprising a computing device 116 and communicatively coupled to a contract oracle 118 comprising a computing device 120. The contract executor 114 stores a smart contract 122 that includes ciphertext 124 comprising sensitive data encrypted using a symmetric cryptographic key K 126. The smart contract 122 also includes an envelope 128 that stores a wrapper 130 in which the symmetric cryptographic key K 126 itself is encrypted using a public cryptographic key e 132 of the contract executor 114, where the public cryptographic key e 132 corresponds to a private cryptographic key E 134 of the contract executor 114. The envelope 128 additionally includes a policy 136 that comprises one or more conditions precedent 138 and is digitally authenticated.

At a point in time after deployment of the smart contract 122 to the contract executor 114, the contract executor 114 determines whether the one or more conditions precedent 138 of the policy 136 of the smart contract 122 have been satisfied, thus indicating that the smart contract 122 can be executed. If so, the contract executor 114 transmits the envelope 128 of the smart contract 122 to the contract oracle 118, as indicated by arrow 144.

Upon receiving the envelope 128, the contract oracle 118 also confirms that the condition(s) precedent 138 of the policy 136 of the smart contract 122 have been satisfied, and then decrypts the wrapper 130 using the private cryptographic key O 142 and transmits the wrapper 130 back to the contract executor 114, as indicated by arrows 146 and 148. Note that, in some examples, the contract oracle 118 may opt to decrypt the wrapper 130 prior to evaluating the policy 136, rather than subsequent to evaluating the policy 136. The contract executor 114 then decrypts the symmetric cryptographic key K 126 of the wrapper 130 using the private cryptographic key E 134. Using the symmetric cryptographic key K 126, the contract executor 114 can decrypt the sensitive data of the ciphertext 124 of the smart contract 122, and execute the smart contract 122 using the sensitive data.

Figure 5:
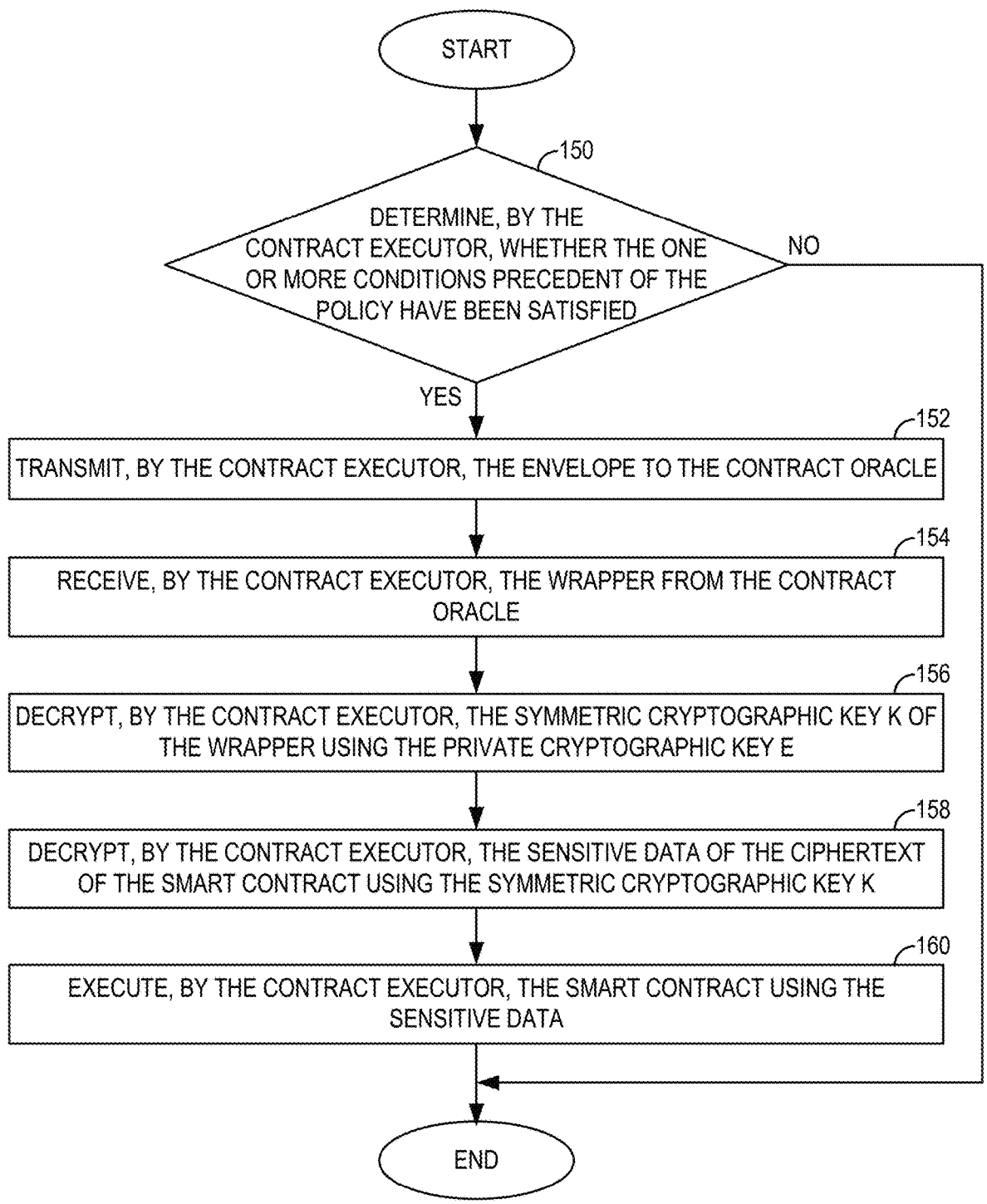
FIG. 5 is a flowchart of a method for obtaining a symmetric cryptographic key K of a contract creator by a contract executor and executing a smart contract by the contract executor, according to one example.

To illustrate operations for obtaining the symmetric cryptographic key K 126 by the contract executor 114 and executing the smart contract 122 by the contract executor 114 according to one example, FIG. 5 is provided. Elements of FIG. 4 are referenced in describing FIG. 5 for the sake of clarity. In FIG. 5, operations begin with the contract executor 114 determining whether the one or more conditions precedent 138 of the policy 136 have been satisfied (block 150). If not, operations in FIG. 5 end. However, if the contract executor 114 determines at decision block 150 that the one or more conditions precedent 138 of the policy 136 have been satisfied, the contract executor 114 transmits the envelope 128 to the contract oracle 118 (block 152). The contract executor 114 subsequently receives the wrapper 130 from the contract oracle 118 (i.e., decrypted from the envelope 128 by the contract oracle 118) (block 154).

The contract executor 114 next decrypts the symmetric cryptographic key K 126 of the wrapper 130 using the private cryptographic key E 134 (block 156). The contract executor 114 also decrypts sensitive data of the ciphertext 124 of the smart contract 122 using the symmetric cryptographic key K 126 (block 158). The contract executor 114 then executes the smart contract 122 using the sensitive data (block 160). Operations in FIG. 5 then end.

Figure 6:
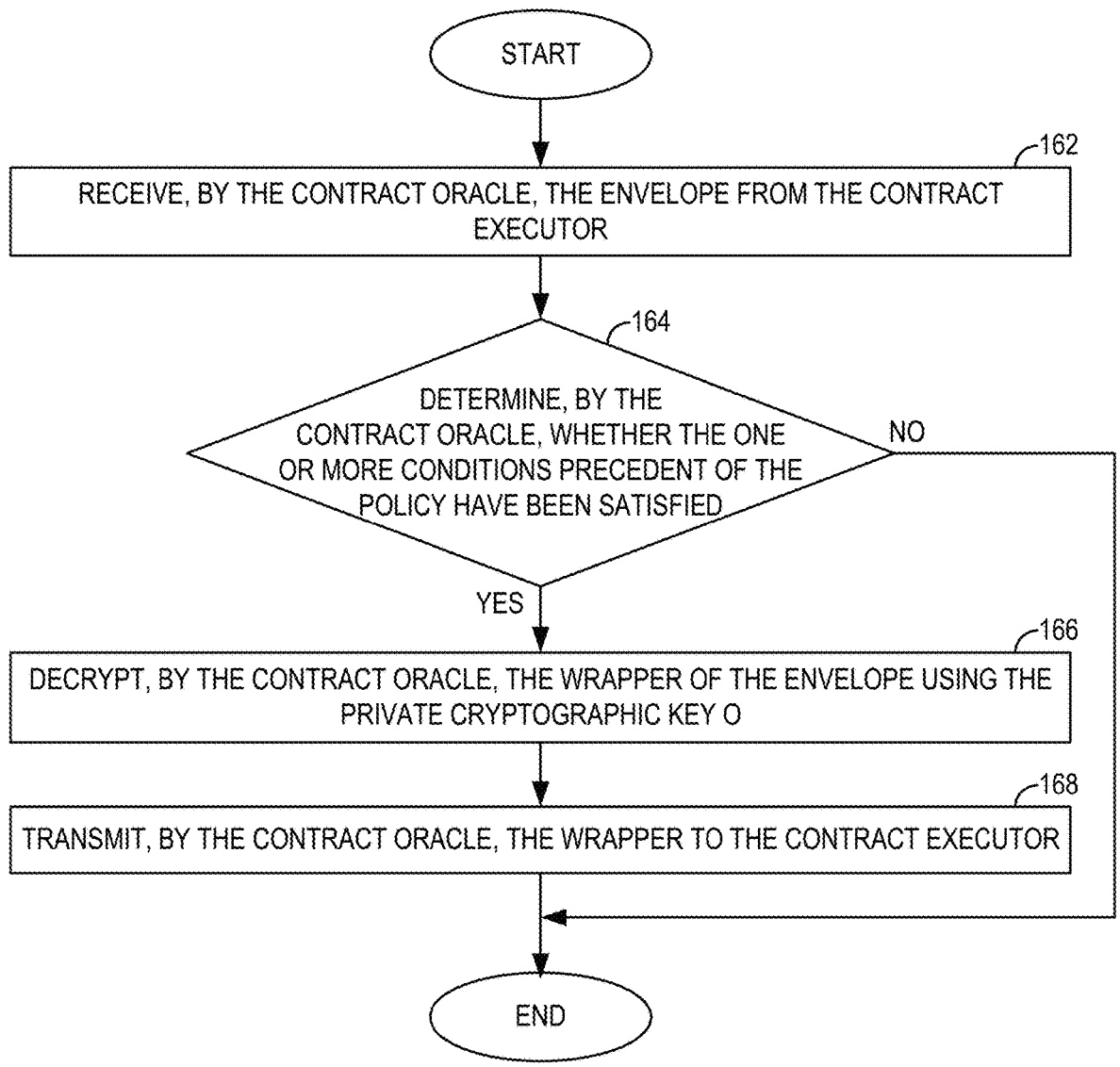
FIG. 6 is a flowchart of a method for decrypting and providing a wrapper containing an encrypted symmetric cryptographic key K of a contract creator by a contract oracle.

FIG. 6 illustrates a method for decrypting and providing the wrapper 130 containing the encrypted symmetric cryptographic key K 126 by the contract oracle 118 of FIG. 4, according to one example. For the sake of clarity, elements of FIG. 4 are referenced in describing FIG. 6. Operations in FIG. 6 begin with the contract oracle 118 receiving the envelope 128 from the contract executor 114 (block 162). The contract oracle 118 then determines whether the one or more conditions precedent 138 of the policy 136 have been satisfied (block 164). If not, operations in FIG. 6 end. However, if the contract oracle 118 determines at decision block 164 that the one or more conditions precedent 138 of the policy 136 have been satisfied, the contract oracle 118 decrypts the wrapper 130 of the envelope 128 using the private cryptographic key O 142 (block 166). The contract oracle 118 transmits the wrapper 130 to the contract executor 114 (block 168). Note that, in some examples, the operations of blocks 164 and 166 of FIG. 6 may be performed in reverse order relative to the order shown in FIG. 6. Thus, in such examples, the contract oracle 118 may perform the operations of block 166 for decrypting the wrapper 130 of the envelope 128 using the private cryptographic key O 142 prior to performing the operations of block 164 for determining whether the one or more conditions precedent 138 of the policy 136 have been satisfied.

Figure 7:
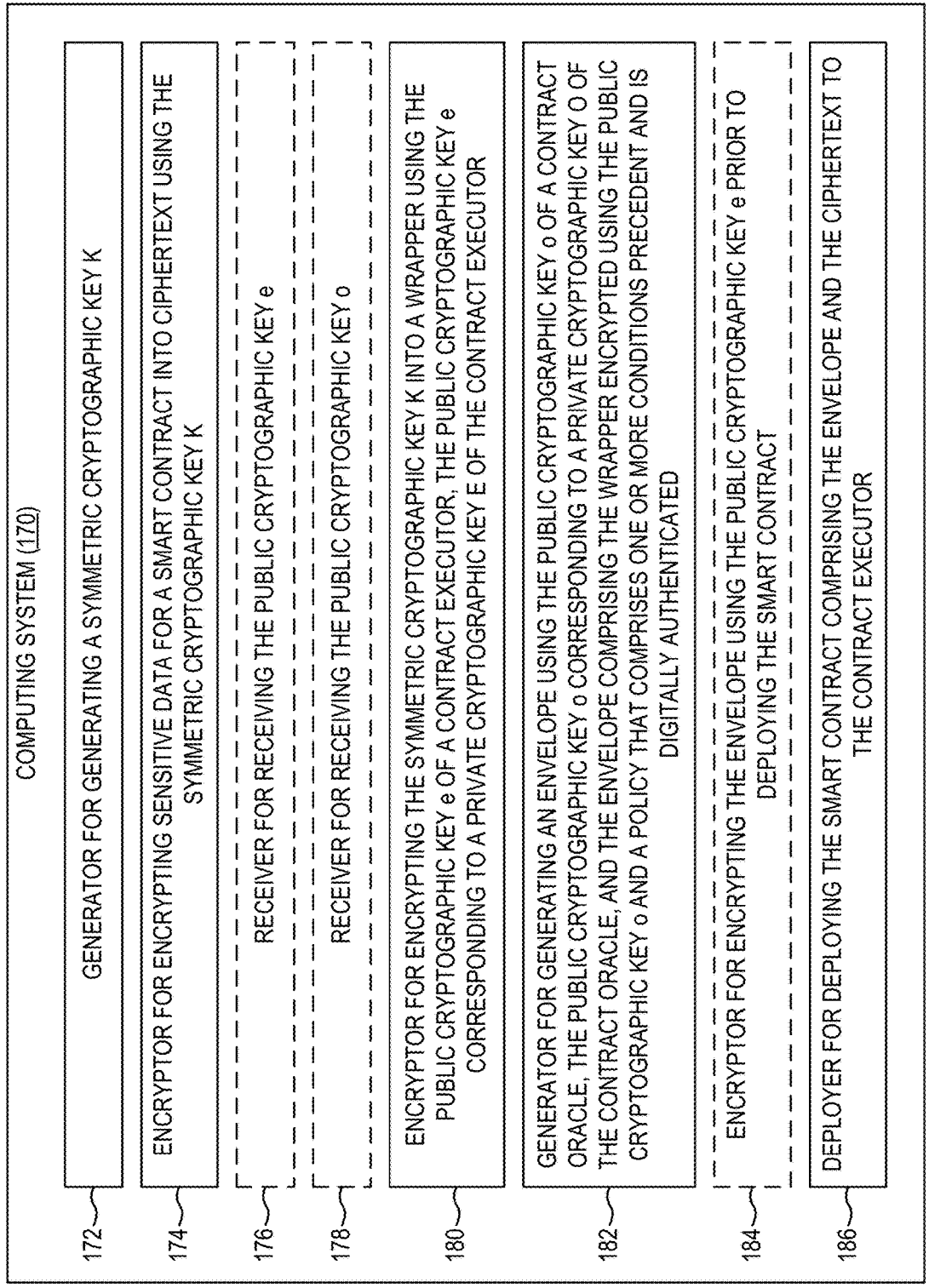
FIG. 7 is a block diagram of a computing system suitable for implementing examples, according to one example.

FIG. 7 is a block diagram of a computing system 170 suitable for implementing examples according to one example. In this example, the computing system 170 includes a generator 172 for generating a symmetric cryptographic key K. The computing system 170 further includes an encryptor 174 for encrypting sensitive data for a smart contract into ciphertext using the symmetric cryptographic key K. According to some examples, the computing system 170 may include a receiver 176 for receiving a public cryptographic key e. Some examples may also provide that the computing system 170 includes a receiver 178 for receiving a public cryptographic key o.

The computing system 170 further includes an encryptor 180 for encrypting the symmetric cryptographic key K into a wrapper using the public cryptographic key e of a contract executor, the public cryptographic key e corresponding to a private cryptographic key E of the contract executor. The computing system 170 also includes a generator 182 for generating an envelope using the public cryptographic key o of a contract oracle, the public cryptographic key o corresponding to a private cryptographic key O of the contract oracle, and the envelope comprising the wrapper encrypted using the public cryptographic key o and a policy that comprises one or more conditions precedent and is digitally authenticated. The computing system 170, according to some examples, includes an encryptor 184 for encrypting the envelope using the public cryptographic key e prior to deploying the smart contract. The computing system 170 further includes a deployer 186 for deploying the smart contract, comprising the envelope and the ciphertext, to the contract executor.

Figure 8:
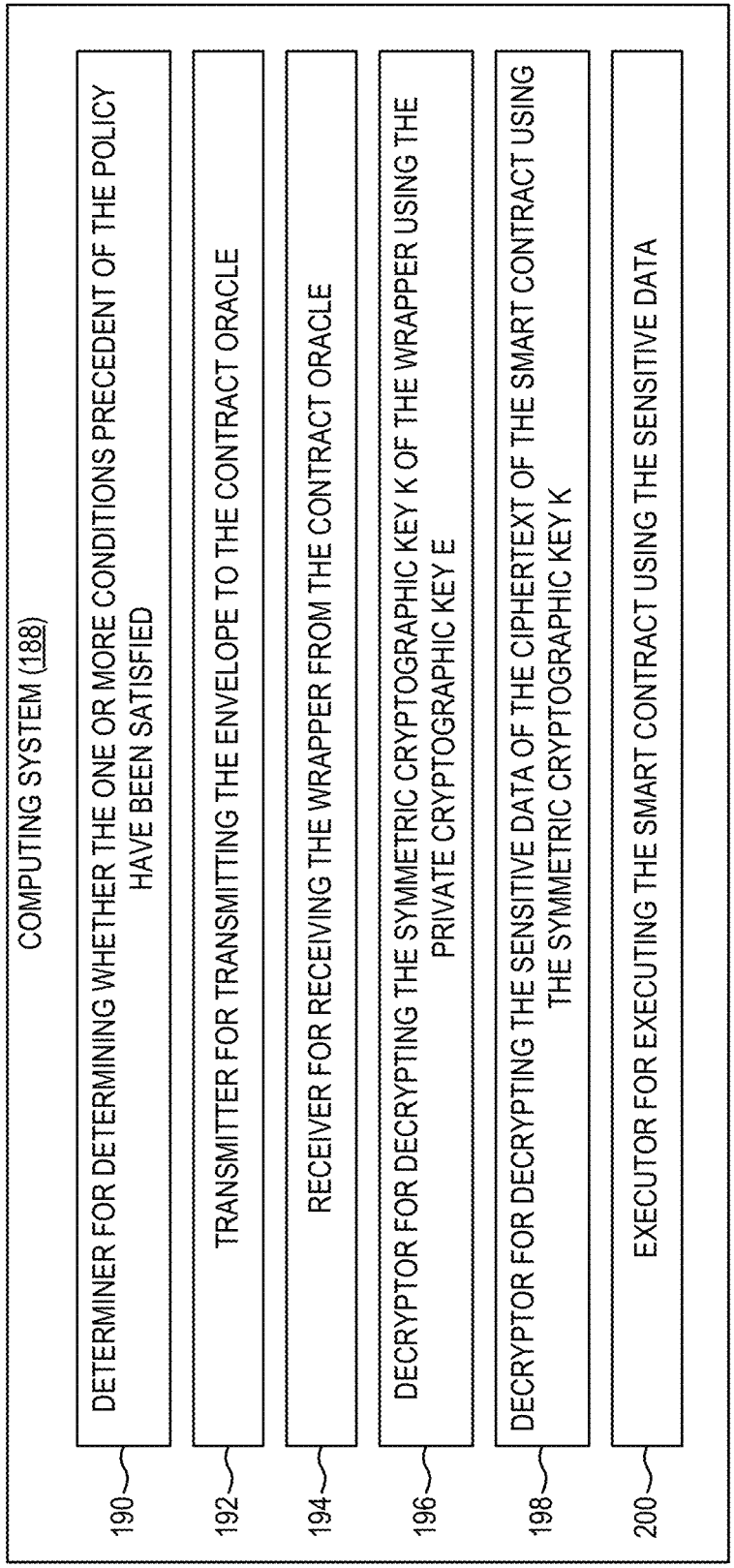
FIG. 8 is a block diagram of a computing system suitable for implementing examples, according to another example.

FIG. 8 is a block diagram of a computing system 188 suitable for implementing examples according to another example. According to this example, the computing system 188 includes a determiner 190 for determining whether one or more conditions precedent of a policy of a smart contract have been satisfied. The computing system 188 further includes a transmitter 192 for transmitting an envelope to a contract oracle. The computing system 188 also includes a receiver 194 for receiving a wrapper from the contract oracle. The computing system 188 additionally includes a decryptor 196 for decrypting a symmetric cryptographic key K of the wrapper using a private cryptographic key E. The computing system 188 further includes a decryptor 198 for decrypting sensitive data of ciphertext of the smart contract using a symmetric cryptographic key K. The computing system 188 also includes an executor 200 for executing the smart contract using the sensitive data.

Figure 9:
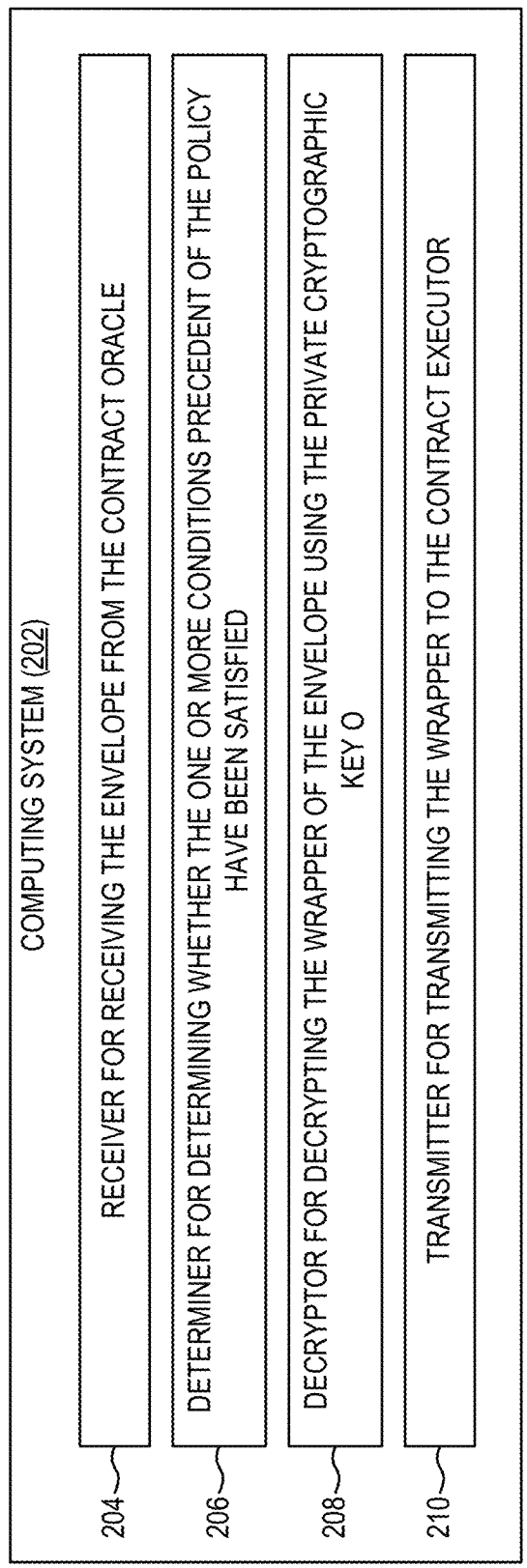
FIG. 9 is a block diagram of a computing system suitable for implementing examples, according to yet another example.

FIG. 9 is a block diagram of a computing system 202 suitable for implementing examples according to yet another example. In this example, the computing system 202 includes a receiver 204 for receiving an envelope from a contract executor. The computing system 202 further includes a determiner 206 for determining whether the one or more conditions precedent of a policy of a smart contract have been satisfied. The computing system 202 also includes a decryptor 208 for decrypting a wrapper of the envelope using a private cryptographic key O. The computing system 202 additionally includes a transmitter 210 for transmitting the wrapper to the contract executor.

Figure 10:
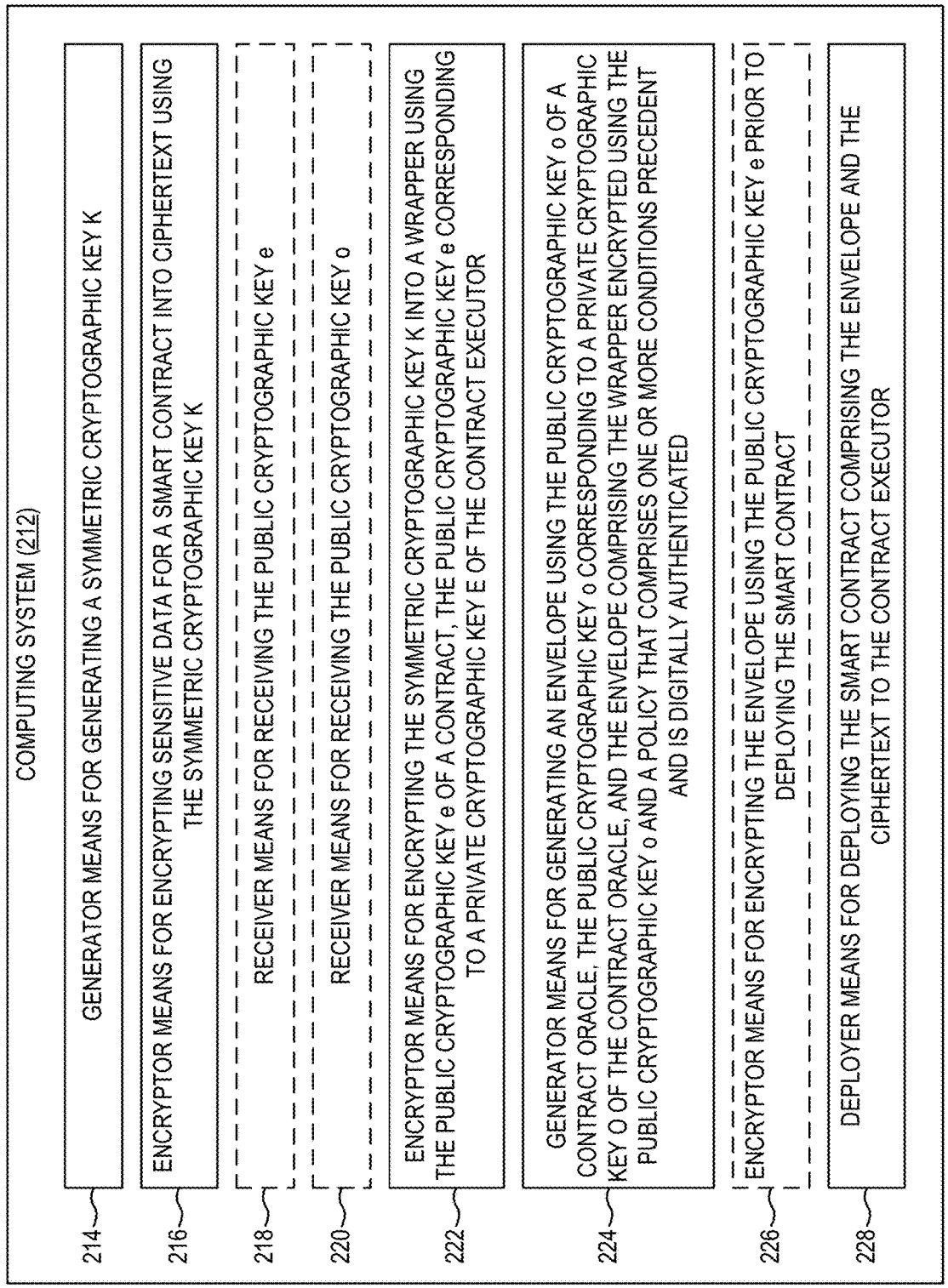
FIG. 10 is a block diagram of a computing system providing means suitable for implementing examples, according to one example.

FIG. 10 is a block diagram of a computing system 212 suitable for implementing examples according to one example. In this example, the computing system 212 includes a generator means 214 for generating a symmetric cryptographic key K. The computing system 212 further includes an encryptor means 216 for encrypting sensitive data for a smart contract into ciphertext using the symmetric cryptographic key K. According to some examples, the computing system 212 may include a receiver means 218 for receiving a public cryptographic key e. Some examples may also provide that the computing system 212 includes a receiver means 220 for receiving a public cryptographic key o.

The computing system 212 further includes an encryptor means 222 for encrypting the symmetric cryptographic key K into a wrapper using the public cryptographic key e of a contract executor, the public cryptographic key e corresponding to a private cryptographic key E of the contract executor. The computing system 212 also includes a generator means 224 for generating an envelope using the public cryptographic key o of a contract oracle, the public cryptographic key o corresponding to a private cryptographic key O of the contract oracle, and the envelope comprising the wrapper encrypted using the public cryptographic key o and a policy that comprises one or more conditions precedent and is digitally authenticated. The computing system 212, according to some examples, includes an encryptor means 226 for encrypting the envelope using the public cryptographic key e prior to deploying the smart contract. The computing system 212 further includes a deployer means 228 for deploying the smart contract comprising the envelope and the ciphertext to the contract executor.

Figure 11:
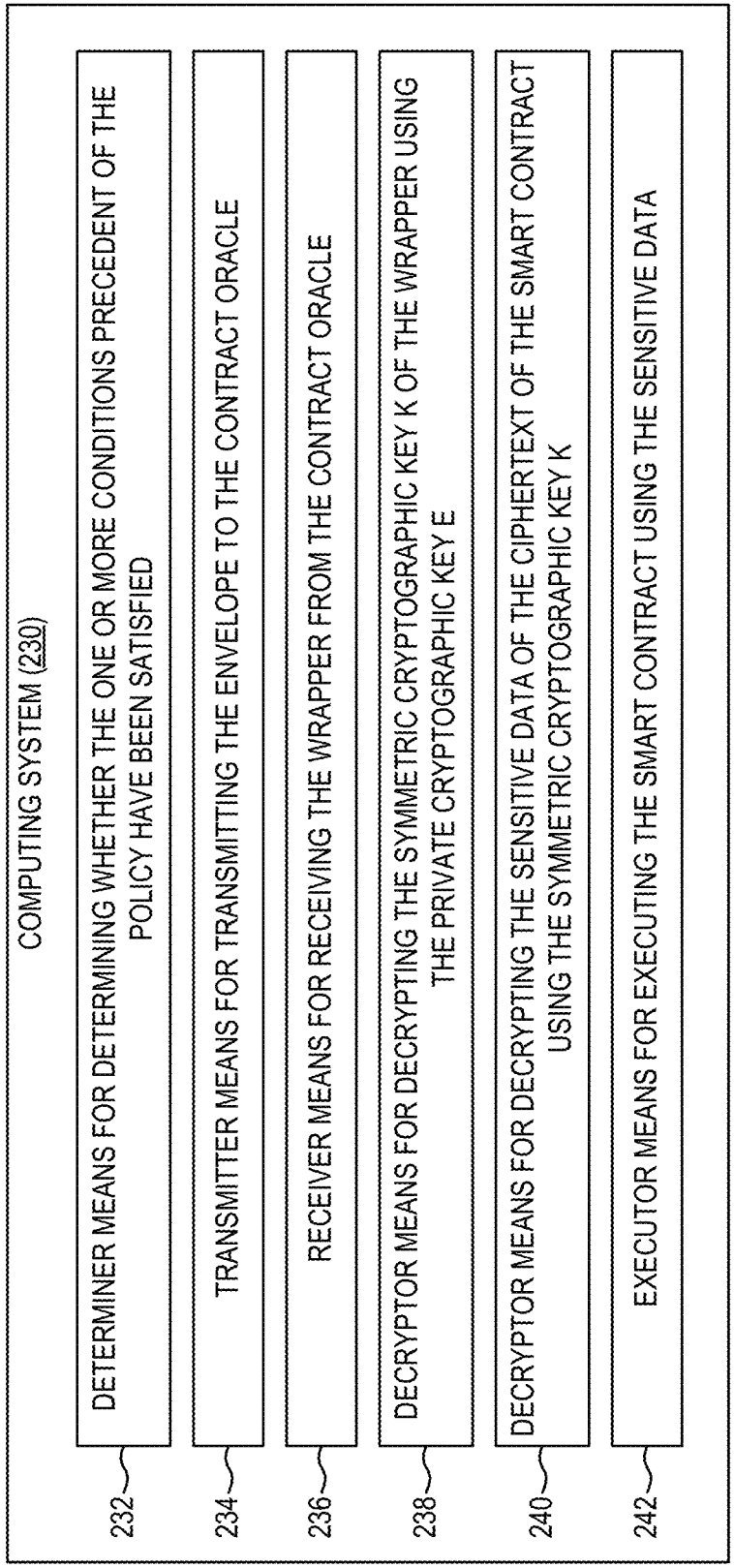
FIG. 11 is a block diagram of a computing system providing means suitable for implementing examples, according to another example.

FIG. 11 is a block diagram of a computing system 230 suitable for implementing examples according to still another example. According to this example, the computing system 230 includes a determiner means 232 for determining whether one or more conditions precedent of a policy of a smart contract have been satisfied. The computing system 230 further includes a transmitter means 234 for transmitting an envelope to a contract oracle. The computing system 230 also includes a receiver means 236 for receiving a wrapper from the contract oracle. The computing system 230 additionally includes a decryptor means 238 for decrypting a symmetric cryptographic key K of the wrapper using a private cryptographic key E. The computing system 230 further includes a decryptor means 240 for decrypting sensitive data of ciphertext of the smart contract using a symmetric cryptographic key K. The computing system 230 also includes an executor means 242 for executing the smart contract using the sensitive data.

Figure 12:
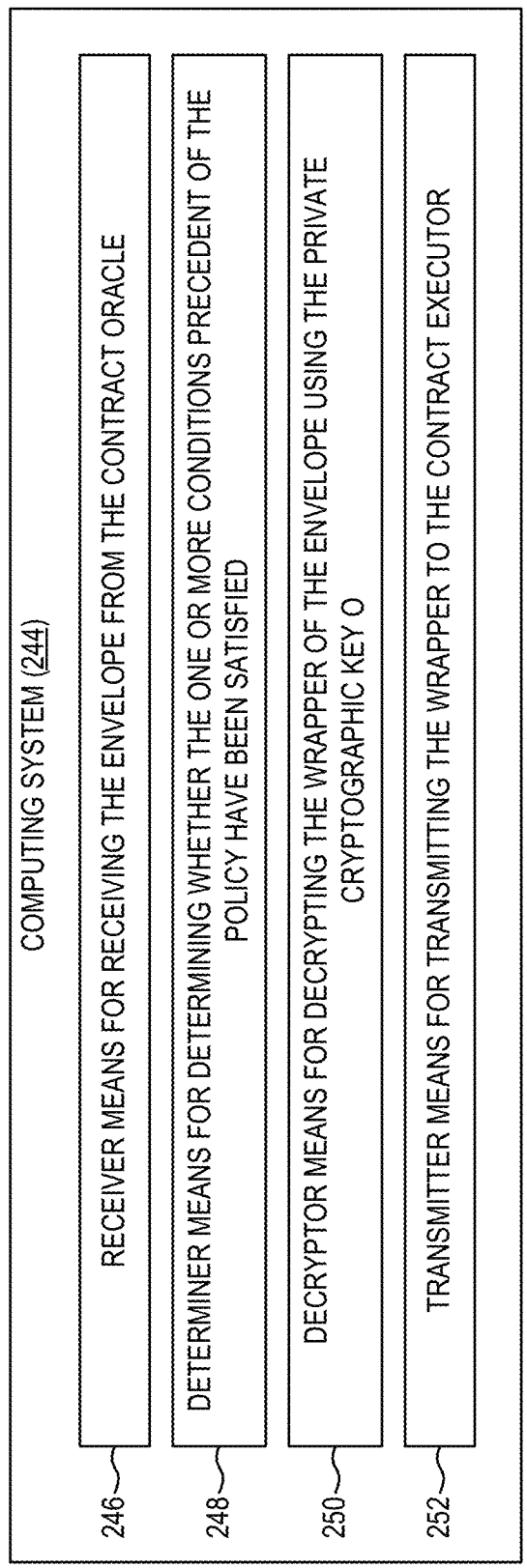
FIG. 12 is a block diagram of a computing system providing means suitable for implementing examples, according to yet another example.

FIG. 12 is a block diagram of a computing system 244 suitable for implementing examples according to yet another example. In this example, the computing system 244 includes a receiver means 246 for receiving an envelope from a contract executor. The computing system 244 also includes a determiner means 248 for determining whether the one or more conditions precedent of a policy of a smart contract have been satisfied. The computing system 244 further includes a decryptor means 250 for decrypting a wrapper of the envelope using a private cryptographic key O. The computing system 244 additionally includes a transmitter means 252 for transmitting the wrapper to the contract executor.

Figure 13:
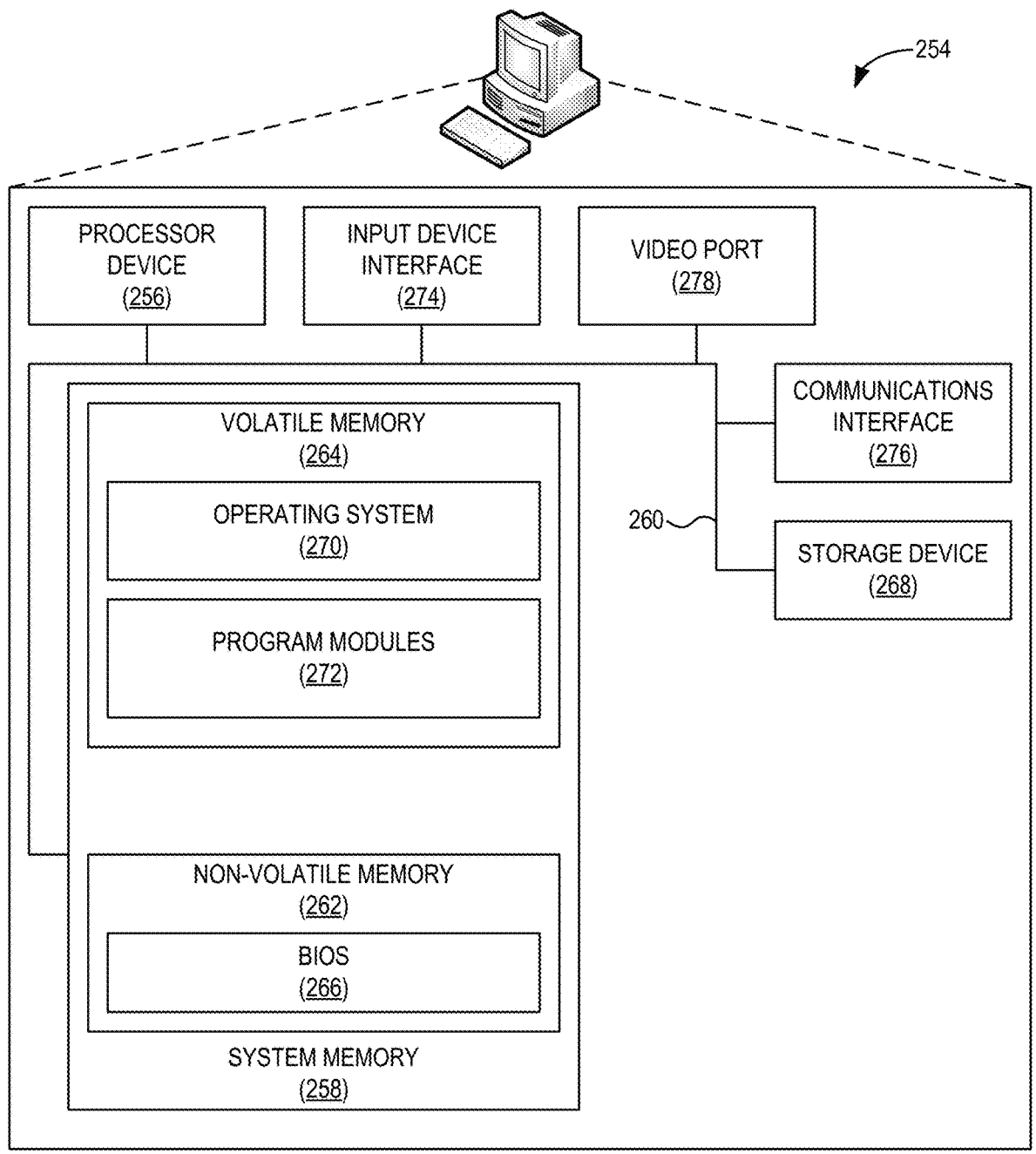
FIG. 13 is a block diagram of a computing device suitable for implementing examples, according to one example.

FIG. 13 is a block diagram of a processor-based computing device 254 ("computing device 254"), such as the first computing device 14, the second computing device 18, or the third computing device 22 of FIG. 1, suitable for implementing examples, according to one example. The computing device 254 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 254 includes a processor device 256, a system memory 258, and a system bus 260. The system bus 260 provides an interface for system components including, but not limited to, the system memory 258 and the processor device 256. The processor device 256 can be any commercially available or proprietary processor.

The system bus 260 may be any of several types of bus structures that may further interconnect to a memory bus (with or without a memory controller), a peripheral bus, and/or a local bus using any of a variety of commercially available bus architectures. The system memory 258 may include non-volatile memory 262 (e.g., read-only memory (ROM), erasable programmable ROM (EPROM), electrically EPROM (EEPROM), etc.), and volatile memory 264 (e.g., RAM). A basic input/output system (BIOS) 266 may be stored in the non-volatile memory 262 and can include the basic routines that help to transfer information among elements within the computing device 254. The volatile memory 264 may also include a high-speed RAM, such as static RAM, for caching data.

The computing device 254 may further include or be coupled to a non-transitory computer-readable storage medium such as a storage device 268, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 268 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 268 and in the volatile memory 264, including an operating system 270 and one or more program modules 272 which may implement the functionality described herein in whole or in part. It is to be appreciated that the examples can be implemented with various commercially available operating systems 270 or combinations of operating systems 270. All or a portion of the examples may be implemented as a computer program product stored on a transitory or non-transitory computer-usable or computer-readable storage medium, such as the storage device 268, which includes complex programming instructions, such as complex computer-readable program code, to cause the processor device 256 to carry out the steps described herein. Thus, the computer-readable program code can comprise software instructions for implementing the functionality of the examples described herein when executed on the processor device 256. The processor device 256 may serve as a controller, or control system, for the computing device 254 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 256 through an input device interface 274 that is coupled to the system bus 260 but can be connected by other interfaces, such as a parallel port, an Institute of Electrical and Electronic Engineers (IEEE) 1394 serial port, a Universal Serial Bus (USB) port, an IR interface, and the like.

The computing device 254 may also include a communications interface 276 suitable for communicating with a network as appropriate or desired. The computing device 254 may also include a video port 278 to interface with a display device to provide information to a user.

Individuals will recognize improvements and modifications to the preferred examples of the disclosure. All such improvements and modifications are considered within the scope of the concepts disclosed herein and the claims that follow.

Other computing system designs and configurations may also be suitable to implement the systems, apparatus, and methods described herein. The following examples illustrate various implementations in accordance with one or more aspects of the present disclosure.

Example 1 is a computing system, comprising a contract creator comprising a first computing device comprising a first memory and a first processor device coupled to the first memory, the contract creator to: generate a symmetric cryptographic key K; encrypt sensitive data for a smart contract into ciphertext using the symmetric cryptographic key K; encrypt the symmetric cryptographic key K into a wrapper using a public cryptographic key e of a contract executor, the public cryptographic key e corresponding to a private cryptographic key E of the contract executor; generate an envelope using a public cryptographic key o of a contract oracle, the public cryptographic key o corresponding to a private cryptographic key O of the contract oracle, and the envelope comprising the wrapper encrypted using the public cryptographic key o and a policy that comprises one or more conditions precedent and is digitally authenticated; and deploy the smart contract comprising the envelope and the ciphertext to the contract executor.

Example 2 is the computing system of example 1, wherein the contract creator is further to, prior to encrypting the sensitive data for the smart contract and encrypting the symmetric cryptographic key K: receive, from the contract executor, the public cryptographic key e; and receive, from the contract oracle, the public cryptographic key o.

Example 3 is the computing system of example 1, wherein the contract creator is further to, prior to deploying the smart contract, encrypt the envelope using the public cryptographic key e.

Example 4 is the computing system of example 1, wherein the contract creator is to deploy the smart contract comprising the envelope and the ciphertext to the contract executor via a secure transport protocol.

Example 5 is the computing system of example 1, wherein the contract executor comprises a node of a plurality of nodes of a distributed ledger network.

Example 6 is the computing system of example 1, further comprising: the contract executor, comprising a second computing device comprising a second memory and a second processor device coupled to the second memory, and communicatively coupled to the contract creator; and the contract oracle, comprising a third computing device comprising a third memory and a third processor device coupled to the third memory, and communicatively coupled to the contract creator and the contract executor; the contract executor to: determine whether the one or more conditions precedent of the policy have been satisfied; and responsive to determining that the one or more conditions precedent of the policy have been satisfied, transmit the envelope to the contract oracle; the contract oracle to: determine whether the one or more conditions precedent of the policy have been satisfied; and responsive to determining that the one or more conditions precedent of the policy have been satisfied, decrypt the wrapper of the envelope using the private cryptographic key O; and transmit the wrapper to the contract executor; and the contract executor further to: decrypt the symmetric cryptographic key K of the wrapper using the private cryptographic key E; decrypt the sensitive data of the ciphertext of the smart contract using the symmetric cryptographic key K; and execute the smart contract using the sensitive data.

Example 7 is the computing system of example 6, wherein the contract oracle is to decrypt the wrapper of the envelope prior to determining whether the one or more conditions precedent of the policy have been satisfied.

Example 8 is a computing system, comprising: a means for generating a symmetric cryptographic key K; a means for encrypting sensitive data for a smart contract into ciphertext using the symmetric cryptographic key K; a means for encrypting the symmetric cryptographic key K into a wrapper using a public cryptographic key e of a contract executor, the public cryptographic key e corresponding to a private cryptographic key E of the contract executor; a means for generating an envelope using a public cryptographic key o of a contract oracle, the public cryptographic key o corresponding to a private cryptographic key O of the contract oracle, and the envelope comprising the wrapper encrypted using the public cryptographic key o and a policy that comprises one or more conditions precedent and is digitally authenticated; and a means for deploying a smart contract comprising the envelope and the ciphertext to the contract executor.

Example 9 is the computing system of example 8, further comprising: a means for receiving the public cryptographic key e prior to encrypting the sensitive data for the smart contract and encrypting the symmetric cryptographic key K; and a means for receiving the public cryptographic key o prior to encrypting the sensitive data for the smart contract and encrypting the symmetric cryptographic key K.

Example 10 is the computing system of example 8, further comprising a means for encrypting the envelope using the public cryptographic key e prior to deploying the smart contract.

Example 11 is the computing system of example 8, wherein the means for deploying the smart contract comprising the envelope and the ciphertext to the contract executor comprises a means for deploying the smart contract via a secure transport protocol.

Example 12 is the computing system of example 8, wherein the contract executor comprises a node of a plurality of nodes of a distributed ledger network.

Example 13 is the computing system of example 8, further comprising: a means for determining whether the one or more conditions precedent of the policy have been satisfied; a means for transmitting the envelope to the contract oracle, responsive to determining that the one or more conditions precedent of the policy have been satisfied; a means for determining whether the one or more conditions precedent of the policy have been satisfied; a means for decrypting the wrapper of the envelope using the private cryptographic key O, responsive to determining that the one or more conditions precedent of the policy have been satisfied; a means for transmitting the wrapper to the contract executor; a means for decrypting the symmetric cryptographic key K of the wrapper using the private cryptographic key E; a means for decrypting the sensitive data of the ciphertext of the smart contract using the symmetric cryptographic key K; and a means for executing the smart contract using the sensitive data.

Example 14 is the computing system of example 13, wherein the means for decrypting the wrapper of the envelope comprises a means for decrypting the wrapper of the envelope prior to determining whether the one or more conditions precedent of the policy have been satisfied.

Example 15 is a method comprising: generating, by a contract creator comprising a first computing device, a symmetric cryptographic key K; encrypting, by the contract creator, sensitive data for a smart contract into ciphertext using the symmetric cryptographic key K; encrypting, by the contract creator, the symmetric cryptographic key K into a wrapper using a public cryptographic key e of a contract executor comprising a second computing device, the public cryptographic key e corresponding to a private cryptographic key E of the contract executor; generating, by the contract creator, an envelope using a public cryptographic key o of a contract oracle comprising a third computing device, the public cryptographic key o corresponding to a private cryptographic key O of the contract oracle, and the envelope comprising the wrapper encrypted using the public cryptographic key o and a policy that comprises one or more conditions precedent and is digitally authenticated; and deploying, by the contract creator, a smart contract comprising the envelope and the ciphertext to the contract executor.

Example 16 is the method of example 15, further comprising: receiving, by the contract creator, the public cryptographic key e prior to encrypting the sensitive data for the smart contract and encrypting the symmetric cryptographic key K; and receiving, by the contract creator, the public cryptographic key o prior to encrypting the sensitive data for the smart contract and encrypting the symmetric cryptographic key K.

Example 17 is the method of example 15, further comprising encrypting, by the contract creator, the envelope using the public cryptographic key e prior to deploying the smart contract.

Example 18 is the method of example 15, wherein deploying the smart contract comprising the envelope and the ciphertext to the contract executor comprises deploying the smart contract via a secure transport protocol.

Example 19 is the method of example 15, further comprising: determining, by the contract executor, whether the one or more conditions precedent of the policy have been satisfied; responsive to determining that the one or more conditions precedent of the policy have been satisfied, transmitting, by the contract executor, the envelope to the contract oracle; determining, by the contract oracle, whether the one or more conditions precedent of the policy have been satisfied; responsive to determining that the one or more conditions precedent of the policy have been satisfied, decrypting, by the contract oracle, the wrapper of the envelope using the private cryptographic key O; transmitting, by the contract oracle, the wrapper to the contract executor; decrypting, by the contract executor, the symmetric cryptographic key K of the wrapper using the private cryptographic key E; decrypting, by the contract executor, the sensitive data of the ciphertext of the smart contract using the symmetric cryptographic key K; and executing, by the contract executor, the smart contract using the sensitive data.

Example 20 is the method of example 15, wherein the contract executor comprises a node of a plurality of nodes of a distributed ledger network.

Example 21 is the method of example 19, wherein decrypting the wrapper of the envelope comprises decrypting the wrapper of the envelope prior to determining whether the one or more conditions precedent of the policy have been satisfied.

Example 22 is a computing device comprising a memory and a processor device coupled to the memory, the computing device to: generate a symmetric cryptographic key K; encrypt sensitive data for a smart contract into ciphertext using the symmetric cryptographic key K; encrypt the symmetric cryptographic key K into a wrapper using a public cryptographic key e of a contract executor, the public cryptographic key e corresponding to a private cryptographic key E of the contract executor; generate an envelope using a public cryptographic key o of a contract oracle, the public cryptographic key o corresponding to a private cryptographic key O of the contract oracle, and the envelope comprising the wrapper encrypted using the public cryptographic key o and a policy that comprises one or more conditions precedent and is digitally authenticated; and deploy the smart contract comprising the envelope and the ciphertext to the contract executor.

Example 23 is the computing device of example 22, further to, prior to encrypting the sensitive data for the smart contract and encrypting the symmetric cryptographic key K: receive, from the contract executor, the public cryptographic key e; and receive, from the contract oracle, the public cryptographic key o.

Example 24 is the computing device of example 22, further to, prior to deploying the smart contract, encrypt the envelope using the public cryptographic key e.

Example 25 is the computing device of example 22, further to deploy the smart contract comprising the envelope and the ciphertext to the contract executor via a secure transport protocol.

Example 26 is a computer program product stored on a non-transitory computer-readable storage medium and including instructions to cause a processor device to: generate a symmetric cryptographic key K; encrypt sensitive data for a smart contract into ciphertext using the symmetric cryptographic key K; encrypt the symmetric cryptographic key K into a wrapper using a public cryptographic key e of a contract executor comprising a second computing device, the public cryptographic key e corresponding to a private cryptographic key E of the contract executor; generate an envelope using a public cryptographic key o of a contract oracle comprising a third computing device, the public cryptographic key o corresponding to a private cryptographic key O of the contract oracle, and the envelope comprising the wrapper encrypted using the public cryptographic key o and a policy that comprises one or more conditions precedent and is digitally authenticated; and deploy the smart contract comprising the envelope and the ciphertext to the contract executor.

Example 27 is the computer program product of example 26, further including instructions to cause the processor device to receive the public cryptographic key e prior to encrypting the sensitive data for the smart contract and encrypting the symmetric cryptographic key K; and receive the public cryptographic key o prior to encrypting the sensitive data for the smart contract and encrypting the symmetric cryptographic key K.

Example 28 is the computer program product of example 26, further including instructions to cause the processor device to encrypt the envelope using the public cryptographic key e prior to deploying the smart contract.

Example 29 is the computer program product of example 26, further including instructions to cause the processor device to deploy the smart contract comprising the envelope and the ciphertext to the contract executor via a secure transport protocol.

Example 30 is a method comprising: determining, by a contract executor comprising a first computing device, whether one or more conditions precedent of a policy of a smart contract have been satisfied; responsive to determining that the one or more conditions precedent of the policy of the smart contract have been satisfied, transmitting, by the contract executor, an envelope of the smart contract to a contract oracle comprising a second computing device, the envelope comprising a wrapper encrypted using a public cryptographic key o of the contract oracle and a policy that comprises one or more conditions precedent and is digitally authenticated; receiving, from the contract oracle, a wrapper decrypted by the contract oracle from the envelope using a private cryptographic key O of the contract oracle; decrypting, by the contract executor, a symmetric cryptographic key K of the wrapper using a private cryptographic key E; decrypting, by the contract executor, sensitive data of ciphertext of the smart contract using the symmetric cryptographic key K; and executing, by the contract executor, the smart contract using the sensitive data.

Example 31 is the method of example 30, wherein the contract executor comprises a node of a plurality of nodes of a distributed ledger network.

Example 32 is a computing device comprising a memory and a processor device coupled to the memory, the computing device to: determine whether one or more conditions precedent of a policy of a smart contract have been satisfied; responsive to determining that the one or more conditions precedent of the policy of the smart contract have been satisfied, transmit an envelope of the smart contract to a contract oracle, the envelope comprising a wrapper encrypted using a public cryptographic key o of the contract oracle and a policy that comprises one or more conditions precedent and is digitally authenticated; receive, from the contract oracle, a wrapper decrypted by the contract oracle from the envelope using a private cryptographic key O of the contract oracle; decrypt a symmetric cryptographic key K of the wrapper using a private cryptographic key E; decrypt sensitive data of ciphertext of the smart contract using the symmetric cryptographic key K; and execute the smart contract using the sensitive data.

Example 33 is the computing device of example 32, wherein the computing device comprises a node of a plurality of nodes of a distributed ledger network.

Example 34 is a computer program product stored on a non-transitory computer-readable storage medium and including instructions to cause a processor device to: determine whether one or more conditions precedent of a policy of a smart contract have been satisfied; responsive to determining that the one or more conditions precedent of the policy of the smart contract have been satisfied, transmit an envelope of the smart contract to a contract oracle, the envelope comprising the wrapper encrypted using a public cryptographic key o of the contract oracle and a policy that comprises one or more conditions precedent and is digitally authenticated; receive, from the contract oracle, a wrapper decrypted by the contract oracle from the envelope using a private cryptographic key O of the contract oracle; decrypt a symmetric cryptographic key K of the wrapper using a private cryptographic key E; decrypt sensitive data of ciphertext of the smart contract using the symmetric cryptographic key K; and execute the smart contract using the sensitive data.

Example 35 is a method comprising: receiving, by a contract oracle comprising a first computing device, an envelope of a smart contract from a contract executor comprising a second computing device, the envelope comprising a wrapper encrypted using a public cryptographic key o of the contract oracle and a policy that comprises one or more conditions precedent and is digitally authenticated; determining, by the contract oracle, whether the one or more conditions precedent of the policy have been satisfied; and responsive to determining that the one or more conditions precedent of the policy have been satisfied, decrypting, by the contract oracle, the wrapper of the envelope using a private cryptographic key O of the contract oracle; and transmitting, by the contract oracle, the wrapper to the contract executor.

Example 36 is the method of example 35, wherein decrypting the wrapper of the envelope comprises decrypting the wrapper of the envelope prior to determining whether the one or more conditions precedent of the policy have been satisfied.

Example 37 is a computing device comprising a memory and a processor device coupled to the memory, the computing device to: receive an envelope of a smart contract from a contract executor, the envelope comprising a wrapper encrypted using a public cryptographic key o of the contract oracle and a policy that comprises one or more conditions precedent and is digitally authenticated; determine whether the one or more conditions precedent of the policy have been satisfied; and responsive to determining that the one or more conditions precedent of the policy have been satisfied, decrypt the wrapper of the envelope using a private cryptographic key O of the contract oracle; and transmit the wrapper to the contract executor.

Example 38 is the computing device of example 37, further to decrypt the wrapper of the envelope prior to determining whether the one or more conditions precedent of the policy have been satisfied.

Example 39 is a computer program product stored on a non-transitory computer-readable storage medium and including instructions to cause a processor device to: receive an envelope of a smart contract from a contract executor, the envelope comprising a wrapper encrypted using a public cryptographic key o of the contract oracle and a policy that comprises one or more conditions precedent and is digitally authenticated; determine whether the one or more conditions precedent of the policy have been satisfied; and responsive to determining that the one or more conditions precedent of the policy have been satisfied, decrypt the wrapper of the envelope using a private cryptographic key O of the contract oracle; and transmit the wrapper to the contract executor.

Example 40 is the computer program product of example 39, further including instructions to cause the processor device to decrypt the wrapper of the envelope subsequent to determining whether the one or more conditions precedent of the policy have been satisfied and responsive to determining that the one or more conditions precedent of the policy have been satisfied, and prior to transmitting the wrapper to the contract executor.

The examples also facilitate an improvement to computer functionality itself via the enabling of sensitive data to be incorporated directly into smart contracts in encrypted form using encryption keys provided by a contract oracle, and further to be decrypted by a contract executor using decryption keys provided by a contract oracle. Thus, the examples are directed to specific improvements in computer functionality.

What is claimed is:

1. A computing system, comprising a contract creator comprising a first computing device comprising a first memory and a first processor device coupled to the first memory, the contract creator to:
   generate a symmetric cryptographic key K;
   encrypt sensitive data for a smart contract into ciphertext using the symmetric cryptographic key K;
   encrypt the symmetric cryptographic key K into a wrapper using a public cryptographic key e of a contract executor, the public cryptographic key e corresponding to a private cryptographic key E of the contract executor;
   generate an envelope using a public cryptographic key o of a contract oracle, the public cryptographic key o corresponding to a private cryptographic key O of the contract oracle, and the envelope comprising the wrapper encrypted using the public cryptographic key o and a policy that comprises one or more conditions precedent and is digitally authenticated; and
   deploy the smart contract comprising the envelope and the ciphertext to the contract executor.

2. The computing system of claim 1, wherein the contract creator is further to, prior to encrypting the sensitive data for the smart contract and encrypting the symmetric cryptographic key K:
   receive, from the contract executor, the public cryptographic key e; and
   receive, from the contract oracle, the public cryptographic key o.

3. The computing system of claim 1, wherein the contract creator is further to, prior to deploying the smart contract, encrypt the envelope using the public cryptographic key e.

4. The computing system of claim 1, wherein the contract creator is to deploy the smart contract comprising the envelope and the ciphertext to the contract executor via a secure transport protocol.

5. The computing system of claim 1, wherein the contract executor comprises a node of a plurality of nodes of a distributed ledger network.

6. The computing system of claim 1, further comprising:
   the contract executor, comprising a second computing device comprising a second memory and a second processor device coupled to the second memory, and communicatively coupled to the contract creator; and
   the contract oracle, comprising a third computing device comprising a third memory and a third processor device coupled to the third memory, and communicatively coupled to the contract creator and the contract executor;
   the contract executor to:
     determine whether the one or more conditions precedent of the policy have been satisfied; and
     responsive to determining that the one or more conditions precedent of the policy have been satisfied, transmit the envelope to the contract oracle;
   the contract oracle to:
     determine whether the one or more conditions precedent of the policy have been satisfied;
     decrypt the wrapper of the envelope using the private cryptographic key O; and

19 responsive to determining that the one or more conditions precedent of the policy have been satisfied, transmit the wrapper to the contract executor; and the contract executor further to:
  decrypt the symmetric cryptographic key K of the wrapper using the private cryptographic key E;
  decrypt the sensitive data of the ciphertext of the smart contract using the symmetric cryptographic key K; and
  execute the smart contract using the sensitive data.

7. The computing system of claim 6, wherein the contract oracle is to decrypt the wrapper of the envelope prior to determining whether the one or more conditions precedent of the policy have been satisfied.

8. A method comprising:
  generating, by a contract creator comprising a first computing device, a symmetric cryptographic key K;
  encrypting, by the contract creator, sensitive data for a smart contract into ciphertext using the symmetric cryptographic key K;
  encrypting, by the contract creator, the symmetric cryptographic key K into a wrapper using a public cryptographic key e of a contract executor comprising a second computing device, the public cryptographic key e corresponding to a private cryptographic key E of the contract executor;
  generating, by the contract creator, an envelope using a public cryptographic key o of a contract oracle comprising a third computing device, the public cryptographic key o corresponding to a private cryptographic key O of the contract oracle, and the envelope comprising the wrapper encrypted using the public cryptographic key o and a policy that comprises one or more conditions precedent and is digitally authenticated; and
  deploying, by the contract creator, the smart contract comprising the envelope and the ciphertext to the contract executor.

9. The method of claim 8, further comprising:
  receiving, by the contract creator, the public cryptographic key e prior to encrypting the sensitive data for the smart contract and encrypting the symmetric cryptographic key K; and
  receiving, by the contract creator, the public cryptographic key o prior to encrypting the sensitive data for the smart contract and encrypting the symmetric cryptographic key K.

10. The method of claim 8, further comprising encrypting, by the contract creator, the envelope using the public cryptographic key e prior to deploying the smart contract.

11. The method of claim 8, wherein deploying the smart contract comprising the envelope and the ciphertext to the contract executor comprises deploying the smart contract via a secure transport protocol.

12. The method of claim 8, further comprising:
  determining, by the contract executor, whether the one or more conditions precedent of the policy have been satisfied;
  responsive to determining that the one or more conditions precedent of the policy have been satisfied, transmitting, by the contract executor, the envelope to the contract oracle;
  determining, by the contract oracle, whether the one or more conditions precedent of the policy have been satisfied;
  decrypting, by the contract oracle, the wrapper of the envelope using the private cryptographic key O;

20 responsive to determining that the one or more conditions precedent of the policy have been satisfied, transmitting, by the contract oracle, the wrapper to the contract executor;
  decrypting, by the contract executor, the symmetric cryptographic key K of the wrapper using the private cryptographic key E;
  decrypting, by the contract executor, the sensitive data of the ciphertext of the smart contract using the symmetric cryptographic key K; and
  executing, by the contract executor, the smart contract using the sensitive data.

13. The method of claim 12, wherein decrypting the wrapper of the envelope comprises decrypting the wrapper of the envelope prior to determining whether the one or more conditions precedent of the policy have been satisfied.

14. A non-transitory computer-readable medium having stored thereon computer-executable instructions that, when executed, cause one or more processor devices to:
  generate a symmetric cryptographic key K;
  encrypt sensitive data for a smart contract into ciphertext using the symmetric cryptographic key K;
  encrypt the symmetric cryptographic key K into a wrapper using a public cryptographic key e of a contract executor, the public cryptographic key e corresponding to a private cryptographic key E of the contract executor;
  generate an envelope using a public cryptographic key o of a contract oracle, the public cryptographic key o corresponding to a private cryptographic key O of the contract oracle, and the envelope comprising the wrapper encrypted using the public cryptographic key o and a policy that comprises one or more conditions precedent and is digitally authenticated; and
  deploy the smart contract comprising the envelope and the ciphertext to the contract executor.

15. The non-transitory computer-readable medium of claim 14, wherein the computer-executable instructions further cause the one or more processor devices to, prior to encrypting the sensitive data for the smart contract and encrypting the symmetric cryptographic key K:
  receive, from the contract executor, the public cryptographic key e; and
  receive, from the contract oracle, the public cryptographic key o.

16. The non-transitory computer-readable medium of claim 14, wherein the computer-executable instructions further cause the one or more processor devices to, prior to deploying the smart contract, encrypt the envelope using the public cryptographic key e.

17. The non-transitory computer-readable medium of claim 14, wherein the computer-executable instructions cause the one or more processor devices to deploy the smart contract comprising the envelope and the ciphertext to the contract executor via a secure transport protocol.

18. The non-transitory computer-readable medium of claim 14, wherein the contract executor comprises a node of a plurality of nodes of a distributed ledger network.

19. The non-transitory computer-readable medium of claim 14, wherein the computer-executable instructions cause the one or more processor devices to:
  determine, by the contract executor, whether the one or more conditions precedent of the policy have been satisfied;

responsive to determining that the one or more conditions precedent of the policy have been satisfied, transmit, by the contract executor, the envelope to the contract oracle;

determine, by the contract oracle, whether the one or more conditions precedent of the policy have been satisfied;

decrypt, by the contract oracle, the wrapper of the envelope using the private cryptographic key O;

responsive, by the contract oracle, to determining that the one or more conditions precedent of the policy have been satisfied, transmit the wrapper to the contract executor; and decrypt, by the contract executor, the symmetric cryptographic key K of the wrapper using the private cryptographic key E;

decrypt, by the contract executor, the sensitive data of the ciphertext of the smart contract using the symmetric cryptographic key K; and execute, by the contract executor, the smart contract using the sensitive data.

20. The non-transitory computer-readable medium of claim 19, wherein the computer-executable instructions cause the one or more processor devices to decrypt, by the contract oracle, the wrapper of the envelope prior to determining whether the one or more conditions precedent of the policy have been satisfied.

\* \* \* \* \*